US011537118B1

(12) United States Patent
Sepe, Jr. et al.

(10) Patent No.: US 11,537,118 B1
(45) Date of Patent: Dec. 27, 2022

(54) SYSTEM AND METHOD USING BINS TO IDENTIFY GAIN VALUE(S) OF AN ENGAGE/ARREST CONTROLLER IN AN AIRCRAFT ARRESTMENT SYSTEM

(71) Applicant: ELECTRO STANDARDS LABORATORIES, Cranston, RI (US)

(72) Inventors: Raymond B Sepe, Jr., Medfield, MA (US); Yacine Boudria, Middletown, RI (US); Steven Bastien, Exeter, RI (US)

(73) Assignee: Electro Standards Laboratories, Cranston, RI (US)

( * ) Notice: Subject to any disclaimer, the term of this patent is extended or adjusted under 35 U.S.C. 154(b) by 0 days.

(21) Appl. No.: 17/371,799

(22) Filed: Jul. 9, 2021

Related U.S. Application Data

(63) Continuation of application No. 16/697,169, filed on Nov. 26, 2019, now Pat. No. 11,063,541, which is a
(Continued)

(51) Int. Cl.
*B60T 8/17* (2006.01)
*G05D 1/00* (2006.01)
(Continued)

(52) U.S. Cl.
CPC ............ *G05D 1/00* (2013.01); *B64D 27/24* (2013.01); *B64D 31/00* (2013.01); *B64D 31/12* (2013.01);
(Continued)

(58) Field of Classification Search
CPC ......... B64D 27/24; B64D 31/00; H02P 21/05; H02P 21/13; B60T 8/1703
See application file for complete search history.

(56) References Cited

U.S. PATENT DOCUMENTS

| 4,245,955 A | 1/1981 | Lambertson |
| 5,042,965 A | 8/1991 | Niessen |

(Continued)

FOREIGN PATENT DOCUMENTS

JP    2012165610 A    8/2012

OTHER PUBLICATIONS

Krause, "Method of Multiple Reference Frames Applied to the Analysis of Symmetrical Induction Machinery," IEEE Transactions on Power Apparatus and Systems, vol. PAS-87(1), Jan. 1968, pp. 218-227.
(Continued)

*Primary Examiner* — Cortez M Cook
(74) *Attorney, Agent, or Firm* — IP Authority, LLC; Ramraj Soundararajan

(57) ABSTRACT

The design of a novel digital controller for a motor driven aircraft arrestment system of the type used on aircraft carriers is described. The unique control and feedback design of the described controller has many advanced features, which provide many advantages over existing designs for controlling advanced arresting gear systems. Gain scheduling in engage/arrest controllers can be done based on estimated parameters such as speed, effective skew angle, and faults to allow optimized engage/arrest controllers, where the gain scheduling can be defined, discretely, for each "bin" as defined for a range of threshold values, or it can be defined, continuously, using interpolation and/or functions of speed and effective skew. Particularly, controller design gain values $K_{ci}$ and $K_{fi}$ are picked to shape control loop transfer functions and dampen resonances in the aircraft arrestment system.

20 Claims, 13 Drawing Sheets

Related U.S. Application Data continuation of application No. 16/505,682, filed on Jul. 8, 2019, now Pat. No. 10,890,905, which is a continuation-in-part of application No. 14/825,712, filed on Aug. 13, 2015, now Pat. No. 10,348,229.

(60) Provisional application No. 62/043,996, filed on Aug. 29, 2014.

(51) Int. Cl.

| | |
|---|---|
| *G05B 19/18* | (2006.01) |
| *B64D 27/24* | (2006.01) |
| *B64D 31/12* | (2006.01) |
| *H02P 21/05* | (2006.01) |
| *H02P 21/13* | (2006.01) |
| *B64D 31/00* | (2006.01) |
| *G05D 1/08* | (2006.01) |

(52) U.S. Cl.
CPC .............. *G05B 19/18* (2013.01); *H02P 21/05* (2013.01); *H02P 21/13* (2013.01); *G05D 1/08* (2013.01)

(56) References Cited

U.S. PATENT DOCUMENTS

| | | | |
|---|---|---|---|
| 5,050,940 A * | 9/1991 | Bedford | ................ B60T 8/1703 |
| | | | 303/68 |
| 5,513,090 A | 4/1996 | Bhattacharya et al. | |
| 6,972,534 B1 | 12/2005 | Schulz | |
| 7,969,103 B2 | 6/2011 | Sepe, Jr. | |
| 2004/0204776 A1 | 10/2004 | Sri-Jayantha et al. | |
| 2009/0085354 A1 | 4/2009 | Tan | |
| 2009/0251096 A1 | 10/2009 | Schulz | |
| 2011/0134669 A1 | 6/2011 | Yuzurihara | |
| 2012/0212191 A1 | 8/2012 | Yuzurihara et al. | |
| 2013/0082636 A1 | 4/2013 | Ohori | |

OTHER PUBLICATIONS

Xiao et al., "Multiple Reference Frame-Based Control of Three-Phase PWM Boost Rectifiers under Unbalanced and Distorted Input Conditions," IEEE Transactions on Power Electronics, 23(4), Jul. 2008, pp. 2006-2017.

* cited by examiner

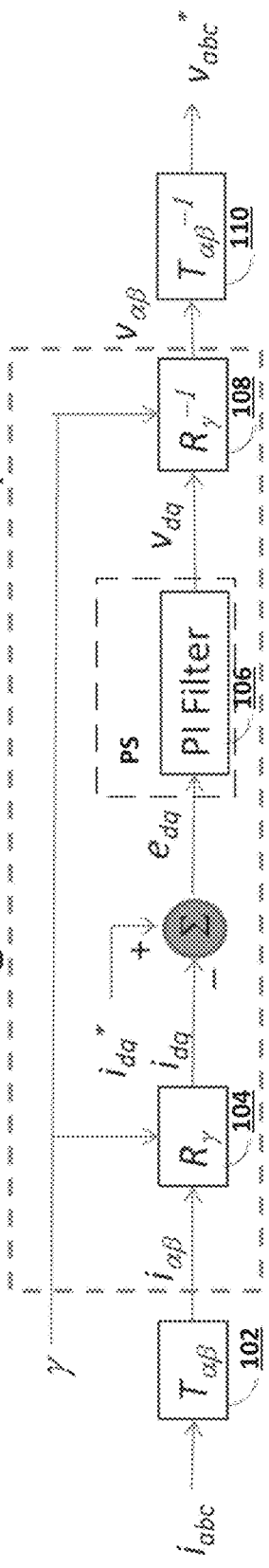
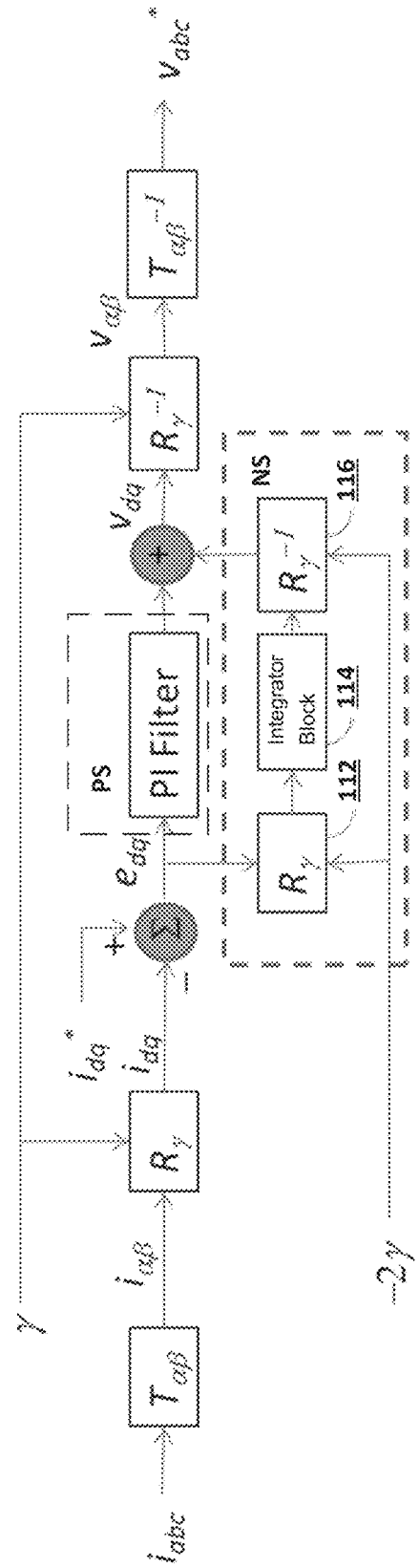
FIG. 1A (PRIOR ART)
FIG. 1B

SYSTEM AND METHOD USING BINS TO IDENTIFY GAIN VALUE(S) OF AN ENGAGE/ARREST CONTROLLER IN AN AIRCRAFT ARRESTMENT SYSTEM

RELATED APPLICATION

This application is a Continuation of U.S. Ser. No. 16/697,169 filed Nov. 26, 2019, which is a Continuation of Ser. No. 16/505,682 filed Jul. 8, 2019, now U.S. Pat. No. 10,890,905, which is a Continuation-in-Part of U.S. Ser. No. 14/825,712 filed Aug. 13, 2015, now U.S. Pat. No. 10,348,229, which claims the benefit of U.S. Ser. No. 62/043,996 filed Aug. 29, 2014.

BACKGROUND OF THE INVENTION

Field of Invention

The present invention relates generally to the field of controllers for advanced arresting gear (AAG) system. More specifically, the present invention is related to a system and method using bins to identify gain value(s) of an engage/arrest controller in an aircraft arrestment system.

Discussion of Related Art

The paper to P. C. Kraus titled "Method of Multiple Reference Frames Applied to the Analysis of Symmetrical Induction Machinery" discusses the mathematics and physical implementation of using multiple reference frames for control of motors.

The paper to P. Xiao titled "Multiple Reference Frame-based Control of Three-Phase PWM Boost Rectifiers under Unbalanced and Distorted Input Conditions" discusses implementation of multiple reference frames for control. However, Xiao's implementation is based on straightforward application of the fundamental ideas in the above-referenced paper to Kraus.

The U.S. Patent to Sepe, Jr. (7,969,103), also assigned to Electro Standards Laboratories, discloses the use of delay state feedback to enhance performance over a wide speed range for electric motors.

Embodiments of the present invention are an improvement over prior art systems and methods.

SUMMARY OF THE INVENTION

In one embodiment, the present invention provides a method to identify a plurality of gain values of an arrest controller in an aircraft arrestment system, the method comprising: (a) maintaining a plurality of bins, each of the bins associated with at least one gain value in the plurality of gain values and covering an output range of an arrest controller function; (b) dynamically computing an arrest controller function value of the arrest controller function that is dependent on one or more of the following input parameters: a port side shaft position $\theta_p$, a starboard side shaft position $\theta_s$, an effective skew angle $\phi$, an aircraft speed b, one or more failure/fault flags, an estimated speed of portside shaft of the arrest controller $\hat{\omega}_{ap}$, and an estimated speed of starboard shaft of the arrest controller $\hat{\omega}_{as}$; (c) identifying a bin within the plurality of bins based on the dynamically computed arrest controller function value in (b); (d) determining, using weighting matrices, at least controller design gain values $K_{ci}$ and $K_{fi}$ within the one or more gain values of the arrest controller corresponding to the bin identified in (c), wherein controller design gain values $K_{ci}$ and $K_{fi}$ are picked to shape control loop transfer functions and dampen resonances in the aircraft arrestment system; and (e) shaping control loop transfer functions and dampening resonances in the aircraft arrestment system by applying the identified controller design gain values $K_{ci}$ and $K_{fi}$ in (d) in the arrest controller in the aircraft arrestment system.

In another embodiment, the present invention provides an article of manufacture comprising non-transitory computer storage medium storing computer readable program code which, when executed by a processor implements a method to identify a plurality of gain values of an arrest controller in an aircraft arrestment system, the medium comprising: (a) computer readable program code executed by the processor to maintain a plurality of bins, each of the bins associated with at least one gain value in the plurality of gain values and covering an output range of an arrest controller function; (b) computer readable program code executed by the processor to dynamically compute an arrest controller function value of the arrest controller function that is dependent on one or more of the following input parameters: a port side shaft position $\theta_p$, a starboard side shaft position $\theta_s$, an effective skew angle $\phi$, an aircraft speed b, one or more failure/fault flags, an estimated speed of portside shaft of the arrest controller $\hat{\omega}_{ap}$, and an estimated speed of starboard shaft of the arrest controller $\hat{\omega}_{as}$; (c) computer readable program code executed by the processor to identify a bin within the plurality of bins based on the dynamically computed arrest controller function value in (b); (d) computer readable program code executed by the processor to determine, using weighting matrices, at least controller design gain values $K_{ci}$ and $K_{fi}$ within the one or more gain values of the arrest controller corresponding to the bin identified in (c), wherein controller design gain values $K_{ci}$ and $K_{fi}$ are picked to shape control loop transfer functions and dampen resonances in the aircraft arrestment system; and (e) computer readable program code executed by the processor to shape control loop transfer functions and dampen resonances in the aircraft arrestment system by applying the identified controller design gain values $K_{ci}$ and $K_{fi}$ in (d) in the arrest controller in the aircraft arrestment system.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 1A depicts a standard control approach, without negative sequence rejection.

FIG. 1B depicts one embodiment of the present invention's negative sequence rejection by operating on an existing error signal.

DESCRIPTION OF THE PREFERRED EMBODIMENTS

Figure 2:
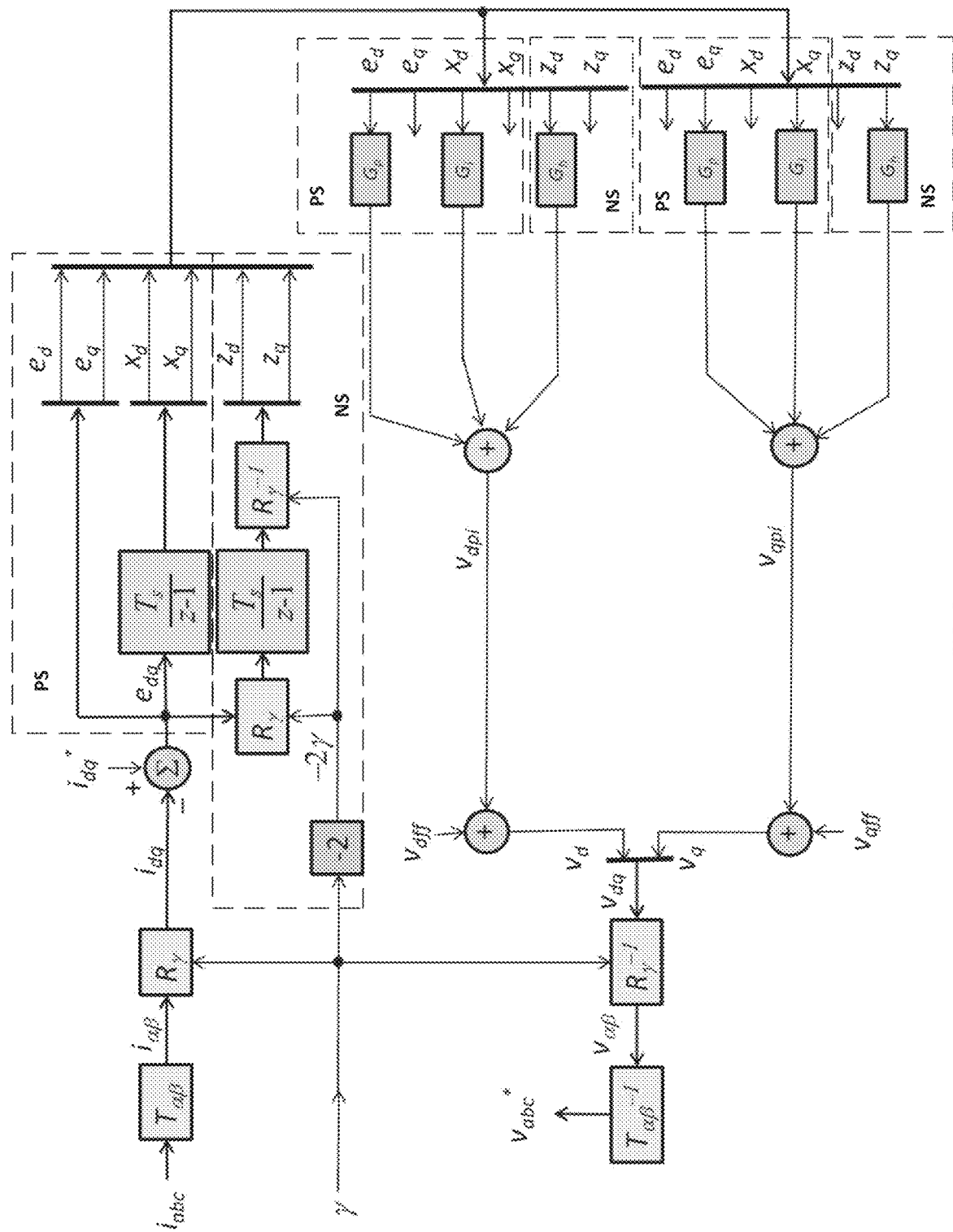
FIG. 2 shows an alternate and extended form of the same NS/PI controller shown in FIG. 1B.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

This present invention describes a design for the negative sequence proportional integral (NS/PI) current control system for linear and rotary electric motors, and by extension to electric power systems, with the discussion here applied to induction motors. The controllers developed here have advanced features, to be described, which provide many advantages over the typical proportion-integral (PI) controllers and over other controllers with negative sequence harmonic suppression. Particularly, the inclusion of a novel negative sequence suppressor based on the transformed positive sequence current $i_{dq}$ error signals to cancel harmonics induced by line imbalance is a key advantage. The use of the shared $i_{dq}$ error signal in this approach allows the positive and negative sequence controllers to operate with minimal interference with each other so that additional filtering to isolate the positive and negative sequence components is not required and thus does not limit controller bandwidth. In addition to providing both positive sequence control and negative sequence suppression control, the controller developed here has extended bandwidth via additional feedback paths and feedback states that are not found in other controllers with negative sequence harmonic injection, and is able to operate over a very broad mechanical speed range, and also works well at relatively high electrical frequencies.

The inclusion of negative sequence control generally alters the frequency response characteristics of a current controller at high frequency and causes reduced gain and phase margins when operating the motor at high speed. In order to allow for greater design flexibility to combat this issue, the NS/PI control modifies the usual industrial approaches and allows cross coupling gains between the d-axis and q-axis current controllers. A design analysis over the full required speed range of the motor indicates that more robust performance is provided with cross coupled gains that are proportional to motor speed, and the existence of any control loop delays, which are normally detrimental to control stability, is dealt with by the innovative inclusion of delay state feedback to provide high bandwidth, low overshoot, small rise time and good stability margins. The net result is a controller with eight or more (two more needed for every loop delay in a given system) unique gains, used symmetrically on each of the two axes, with half of those gains (the cross coupled ones) changing linearly with motor speed.

This controller is more complex to implement than a standard uncoupled PI controller. Fortunately, the use of cross coupled gains (even speed dependent gains) is straightforward to implement digitally in software. The resulting code simply allows more terms than a typical PI controller for calculating the d-axis and q-axis voltage commands. This means a few more multiply and addition operations are required. One complication with establishing the controller design is calculating the required gains. With eight or more unique numbers to determine, manual tuning is not practical, being unduly tedious or even impossible in practice. Hence, a pole placement method can be used to directly calculate the required gains, and pole locations are selected based on design criteria. The method of calculating gains via this methodology is not shown here, but standard textbooks on modern control theory describe this known method.

This design is applied for controlling induction motors with imbalanced phases caused by cabling connections, or other reasons, in industrial environments and shipboard use, especially when the induction motors must provide very fast and accurate control with high bandwidth and good stability margins. However, the installation of such a system requires long power cables which can create line imbalance, resulting in high torque ripple from negative sequence harmonics. Suppression of the torque ripple is problematic with standard control methods because any controller that targets the harmonics requires high frequency operations and this tends to destabilize standard current control topologies, unless the dynamic performance of the control system is reduced to prevent instability. Hence, this disclosed design provides a way to overcome all of these issues and provide a higher bandwidth, and better overall control, even with the added negative sequence suppression feature included.

The method described here, to suppress the negative sequence harmonic caused by imbalance, can be extended to suppress any other positive or negative sequence harmonic, either individually, or collectively. For example, if inverter harmonics introduce undesirable harmonics, then those particular harmonics can be removed by the same basic method.

Controller Design

The controller design is applied in the well-known dqo-axes rotor reference frame. When motor coils share a common neutral point connection, the 0-axis reference frame is not needed in the control design. Here the design is performed in the dq-axes reference frame but is applicable to the dq0-axes reference frame without loss of generality.

FIG. 1A depicts a standard control approach, without negative sequence rejection. The input 3-phase measured currents $i_{abc}$ are transformed to the stationary 2-phase frame currents $i_{\alpha\beta}$ via the $T_{\alpha\beta}$ transform block 102. The stationary frame currents are then transformed to the rotating frame $i_{dq}$ currents via the rotation transform $R_\gamma$ 104. The error signal vector $e_{dq}$ is generated by taking the difference between the measured currents and the commanded currents. The error vector signal is fed through the PI filter 106 to generate a rotating frame voltage command $v_{dq}$, and then the reverse transforms (generated by $R_\gamma^{-1}$ transform block 108 and $T_{\alpha\beta}^{-1}$ transform block 110) are used to generate stationary frame voltage commands.

FIG. 1B depicts one embodiment of the present invention's negative sequence rejection by operating on an existing error signal. The modification is to transform the error signal using a rotation transform at −2 (which is the harmonic factor) times the transform angle. Using the rotation transform $R_\gamma$ 112 but with angle −2γ as input as shown within the dotted box in FIG. 1B, effectively creates a reference frame that is synchronized with the negative sequence harmonic. The integrator block (G/S) 114 is then applied to the transformed error signal and the result is transformed back into the dq synchronous frame via inverse rotational transformation block $R_\gamma^{-1}$ 116, and that signal is added back to the PI filter output to form the $v_{dq}$ voltage command.

Other implementations of negative sequence harmonic suppression controllers develop a separate error signal for the negative sequence portion of the control system. An innovation here (as shown in FIG. 1B) is that the standard error signal $e_{dq}$ used by the standard positive sequence controller is transformed into the negative sequence reference frame and is also used there. Because both the positive and negative sequence controllers share the same error signal $e_{dq}$, undesirable interaction between them is minimized and special filters to separate the negative sequence current components from the positive sequence current components are not needed. This allows for increased controller bandwidth because additional filtering can introduce delays. The sharing of the error signal can be done for any harmonic factor β. Without loss of generality, the example discussed here has β=−2 for the negative sequence harmonic caused by phase imbalance, but any factor can be used. It is also possible to dynamically change β if desired. Transform blocks are showing the matrix operator transforms that operate on the signal vectors. Most of the required math is evident from the diagram. The PI Filter is a gain term added to an amplified integration term and the G/s block is an amplified integration block. Operator transforms are as follows.

$$R_\gamma(\gamma) = \begin{bmatrix} \cos\gamma & \sin\gamma \\ -\sin\gamma & \cos\gamma \end{bmatrix}, R_\gamma^{-1}(\gamma) = \begin{bmatrix} \cos\gamma & -\sin\gamma \\ \sin\gamma & \cos\gamma \end{bmatrix}$$

$$T_{\alpha\beta} = \begin{bmatrix} 0 & \frac{-\sqrt{3}}{3} & \frac{\sqrt{3}}{3} \\ 0 & -1 & -1 \end{bmatrix}, T_{\alpha\beta}^{-1} = \begin{bmatrix} 0 & 1 \\ \frac{-\sqrt{3}}{2} & \frac{-1}{2} \\ \frac{\sqrt{3}}{2} & \frac{-1}{2} \end{bmatrix}$$

FIG. 1A shows the standard PI filter approach typically used for motor control, on the top block diagram. The bottom block diagram, FIG. 1B, shows the modification (with dotted lines) that is added to provide the negative sequence control function. Note the innovation shown in the diagram is that the second controller operates on the existing error signal $e_{dq}$ which is different from other approaches. This has the advantage of simple implementation and automatic prevention of conflict between the two controllers since both controllers try to zero out the error signal. The approach is scalable such that multiple NS Controller Subsystems can be paralleled, with $e_{dq}$ used as input for each one, separate harmonic factors $\beta_m$, for each of the m subsystems, and with the sum of the outputs from each NS Controller Subsystems added to the output of the PI Filter to compute $v_{dq}$ in order to target and simultaneously suppress more than one harmonic.

In one embodiment, the present invention discloses a current controller comprising: a positive sequence controller; and a negative sequence controller, where error signals operated on by said positive sequence controller are transformed into a negative sequence reference frame and input to said negative sequence controller.

In another embodiment, the present invention provides a method as implemented in a current controller for higher bandwidth operation based on minimized interference between positive and negative components of a current controller, said method performed without additional filtering on measured currents to isolate positive and negative current components, said method comprising: identifying error signals operated on by a positive sequence controller; transforming identified error signals into a negative sequence reference frame associated with a negative sequence controller; inputting transformed error signals to a negative sequence controller, and where undesirable interactions between said positive sequence controller and negative sequence controller is minimized by sharing error signals.

The simpler above approach is good for situations where the required control bandwidth is not too stringent, and there is not too much loop delay in the feedback path. FIG. 2 shows an alternate and extended form of the same NS/PI controller shown in FIG. 1B. This form is preferred for control design and is better for showing additional features that can be incorporated into the structure. FIG. 2 shows a more detailed view of FIG. 1B. Here more detail is provided and a feed forward voltage command is added to provide better transient response, as is often done in these systems. The input 3-phase measured currents $i_{abc}$ are transformed to the stationary 2-phase frame currents $i_{\alpha\beta}$ via the $T_{\alpha\beta}$ transform block. The stationary frame currents are then transformed to the rotating frame $i_{dq}$ currents via the rotation transform block $R_\gamma$, which uses the flux angle γ. The error signal vector $e_{dq}$ is generated by taking the difference between the measured currents and the commanded currents. This figure makes the PI filter function explicit. The error signal is split into three paths. In the first path, the error signal vector $e_{dq}$ is multiplied by the proportional gain $G_p$. In the second path, the error signal $e_{dq}$ is integrated by the $T_s/(z-1)$ block and then multiplied by the integral gains $G_i$. In the third path, the error signal is further transformed into the negative sequence frame. The function is to transform the error signal using a rotation transform at −2 times the transform angle γ. In between the to-and-from rotational transforms $R_\gamma$ and $R_\gamma^{-1}$ that are fed with the −2γ angle, an integrator block Ts/(z−1) is inserted. After transformation back to the positive dq-frame, the $z_{dq}$ signal is multiplied by the $G_h$ gain. The three paths are added together, as shown, and then a feedforward signal (as typically used in standard practice) is added to form the dq-frame commanded voltage $v_{dq}$. This commanded voltage is transformed to a stationary frame 2-phase voltage $v_{\alpha\beta}$, using the transform block with input angle $\gamma$. Then, this signal vector is transformed by the $T_{\alpha\beta}^{-1}$ block to form the commanded $v_{abc}^*$ three-phase voltages.

Figure 3:
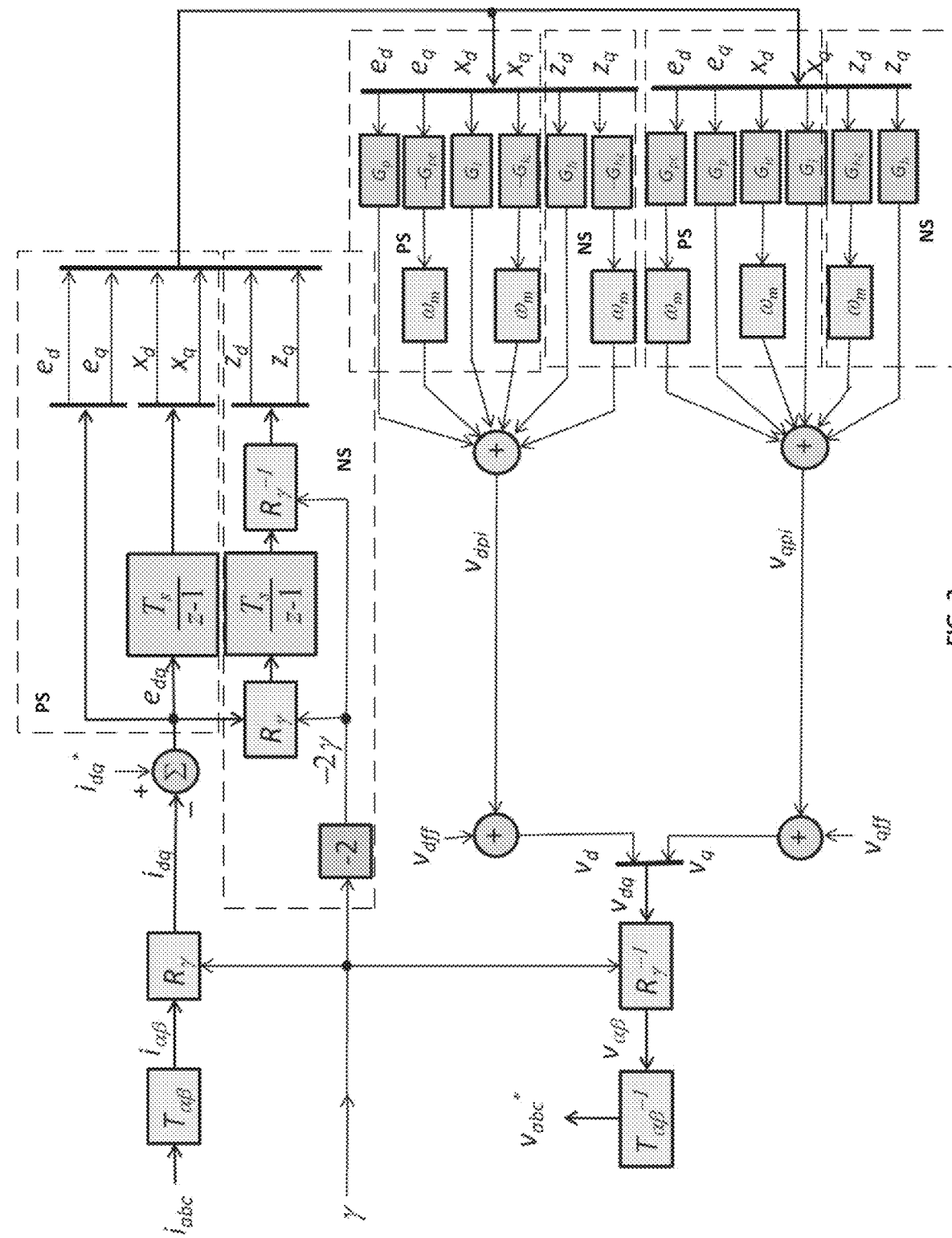
FIG. 3 shows cross coupled gains that are added to a controller.

In more demanding applications where higher bandwidth is desired and the loop delays are not too large, cross coupled gains can be added to the controller as shown in FIG. 3. In general the cross coupled gains could be constant numbers, or can be made functions of motor speed or electrical frequency. The functional form of the speed/frequency dependence can be determined by analysis to place the poles and keep them in the same general spot as speed changes. However, this is complicated and a simplification is to make the cross coupled gains proportional to motor speed, as shown in FIG. 3. FIG. 3 shows an extended block diagram from that in FIG. 2. Here more feedback is provided to create cross coupled gains that allow full pole placement designs to be realized, provided that delays are small. The input 3-phase measured currents $i_{abc}$ are transformed to the stationary 2-phase frame currents $i_{\alpha\beta}$ via the $T_{\alpha\beta}$ transform block. The stationary frame currents are then transformed to the rotating frame $i_{dq}$ currents via the rotation transform $R_\gamma$, which uses the flux angle $\gamma$. The error signal vector $e_{dq}$ is generated by taking the difference between the measured currents and the commanded currents. The error signal is split into three paths. In the first path, the error signal vector $e_{dq}$ formed and split into separate $e_d$ and $e_q$ components. In the second path, the error signal $e_{dq}$ is integrated by the Ts/(z−1) block to create the $x_{dq}$ vector which is then split into separate $x_d$ and $x_q$ components. In the third path, the error signal is further transformed into the negative sequence frame. The function is to transform the error signal using a rotation transform at −2 times the transform angle $\gamma$. In between the to-and-from rotational transforms $R_\gamma$ and that are fed with the −2$\gamma$ angle, an integrator block Ts/(z−1) is inserted. After transformation back to the positive dq-frame, the $z_{dq}$ signal is split into separate $z_d$ and $z_q$ components. The three paths are multiplied by various gain factors and then added together, as shown. The gain multiplications include all of the same $G_p$, $G_i$ and $G_h$ gain multiplications; however, also included are the cross coupled gains which are also scaled by the motor speed to provide adaptive gains. The cross coupled gain signals feeding into the sum junction for $V_{dpi}$ are $-\omega_m G_{pc} e_q$, $-\omega_m G_{ic} x_q$, $-\omega_m G_{hc} z_q$. The cross coupled gain signals feeding into the sum junction for $V_{qpi}$ are $\omega_m G_{pc} e_d$, $\omega_m G_{ic} x_d$, $\omega_m G_{hc} z_d$. Then feedforward signals (as typically used in standard practice) $V_{dff}$ and $V_{qff}$ are added to the $V_{dpi}$ and $V_{qip}$ voltage channels, respectively, to form the dq-frame commanded voltage $v_{dq}$. This commanded voltage is transformed to a stationary frame 2-phase voltage $v_{\alpha\beta}$, using the $R_\gamma^{-1}$ transform block fed with angle $\gamma$. Then, this signal vector is transformed by the $T_{\alpha\beta}^{-1}$ block to form the commanded $v_{abc}^*$ three-phase voltages.

This disclosure identifies the cross coupled gains (constant or speed dependent) as useful for a solution depending on the required system specification. When the cross coupled gains are made proportional to speed, it is often possible to maintain system stability and good performance without having highly complicated functions.

In another embodiment, the present invention provides a current controller comprising: a positive sequence controller, at least one negative sequence controller, and one or more delay state feedbacks to counter control loop delays, said delay state feedbacks providing high bandwidth, low current overshoot, small current rise time and good current stability margins.

In another embodiment, the present invention provides a method as implemented in a current controller to address a negative sequence control altering a frequency response characteristics of said current controller at high frequency causing reduced gain and phase margins when operating a motor at high speed, said current controller comprising a positive sequence controller and at least one negative sequence controller, said method comprising: identifying control loop delays in said current controller; and providing one or more delay state feedback to counter control loop delays, said delay state feedback providing high bandwidth, low current overshoot, small current rise time and good current stability margins.

In another embodiment, the present invention provides a current controller comprising: a positive sequence controller, at least one negative sequence controller, and one or more cross coupled gains between a d-axis and a q-axis, said cross coupled gains proportional to speed of a motor associated with said current controller. In an extended embodiment, the gains can be a general scaled function of speed in order for the design to work over an entire operating speed of said motor.

In another embodiment, the present invention provides a method as implemented in a current controller associated with a motor, said current controller comprising a positive sequence controller and at least one negative sequence controller, said method comprising: identifying a speed of said motor; and providing one or more cross coupled gains between a d-axis and a q-axis, said cross coupled gains proportional to said identified speed of said motor. In an extended embodiment, the gains can be a general scaled function of speed in order for the design to work over an entire operating speed of said motor.

In another embodiment, the present invention provides a current controller comprising: a positive sequence controller, at least one negative sequence controller, one or more delay state feedback to counter control loop delays, said delay state feedback providing high bandwidth, low current overshoot, small current rise time and good current stability margins; and one or more cross coupled gains between a d-axis and a q-axis, said cross coupled gains proportional to speed of a motor associated with said current controller. In an extended embodiment, the gains can be a general scaled function of speed in order for the design to work over an entire operating speed of said motor.

In another embodiment, the present invention provides a method as implemented in a current controller associated with a motor, said current controller comprising a positive sequence controller and at least one negative sequence controller, said method comprising: identifying a speed of said motor; providing one or more delay state feedback to counter control loop delays, said delay state feedback providing high bandwidth, low current overshoot, small current rise time and good current stability margins; and providing one or more cross coupled gains between a d-axis and a q-axis, said cross coupled gains proportional to said identified speed of said motor. In an extended embodiment, the gains can be a general scaled function of speed in order for the design to work over an entire operating speed of said motor.

Figure 4:
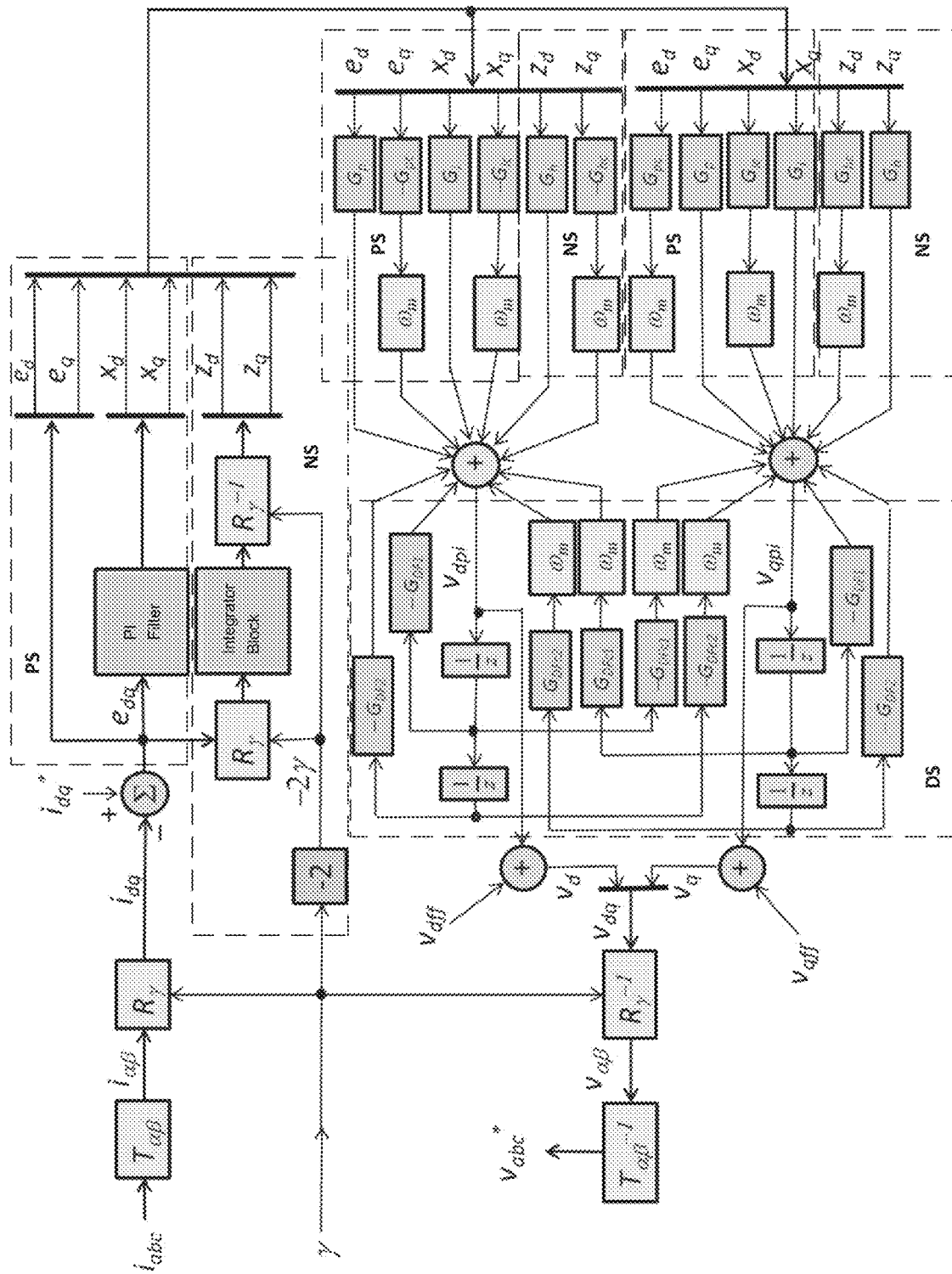
FIG. 4 shows a block diagram for the NS/PI vector current control system with both speed dependent cross coupling feedback and delay state feedback.

The block diagram for the NS/PI vector current control system in its most advanced form, with both speed dependent cross coupling feedback and delay state feedback, is shown in FIG. 4. FIG. 4 shows an extended block diagram from that in FIG. 3. Here more feedback is provided to create delay state gains that allow full pole placement designs to be realized, when delays can't be neglected. The input 3-phase measured currents $i_{abc}$ are transformed to the stationary 2-phase frame currents $i_{\alpha\beta}$ via the $T_{\alpha\beta}$ transform block. The stationary frame currents are then transformed to the rotating frame $i_{dq}$ currents via the rotation transform $R_\gamma$, which uses the flux angle $\gamma$. The error signal vector $e_{dq}$ is generated by taking the difference between the measured currents and the commanded currents. The error signal is split into three paths. In the first path, the error signal vector $e_{dq}$ formed and split into separate $e_d$ and $e_q$ components. In the second path, the error signal $e_{dq}$ is integrated by the $Ts/(z-1)$ block to create the $x_{dq}$ vector which is then split into separate $x_d$ and $x_q$ components. In the third path, the error signal is further transformed into the negative sequence frame. The function is to transform the error signal using a rotation transform at $-2$ times the transform angle $\gamma$. In between the to-and-from rotational transforms $R_\gamma$ and $R_\gamma^{-1}$ that are fed with the $-2\gamma$ angle, an integrator block $Ts/(z-1)$ is inserted. After transformation back to the positive dq-frame, the $z_{dq}$ signal is split into separate $z_d$ and $z_q$ components. The three paths are multiplied by various gain factors and then added together, as shown. The gain multiplications include all of the same $G_p$, $G_i$ and $G_h$ gain multiplications; and also included are the cross coupled gains which are also scaled by the motor speed to provide adaptive gains. Additionally, the delay states are implemented in the block diagram and then delay state gains, and cross coupled gains (also scaled by motor speed) are added. The cross coupled gain signals feeding into the sum junction for $V_{dpi}$ are $-\omega_m G_{pc} e_q$, $-\omega_m G_{ic} x_q$, $-\omega_m G_{hc} z_q$, $\omega_m G_{DFc1} V_{qpi1}$, and $\omega_m G_{DFc2} V_{qpi2}$, where $V_{qpi1}$ and $V_{qpi2}$ are the first and second delay states of $V_{qpi}$. The cross coupled gain signals feeding into the sum junction for $V_{qpi}$ are $\omega_m G_{pc} e_d$, $\omega_m G_{ic} x_d$, $\omega_m G_{hc} z_d$, $-\omega_m G_{DFc1} V_{dpi1}$, and $-\omega_m G_{DFc2} V_{dpi2}$, where $V_{dpi1}$ and $V_{dpi2}$ are the first and second delay states of $V_{dpi}$. Then feedforward signals (as typically used in standard practice) $V_{dff}$ and $V_{qff}$ are added to the $V_{dpi}$ and $V_{qpi}$ voltage channels, respectively, to form the dq-frame commanded voltage $v_{dq}$. This commanded voltage is transformed to a stationary frame 2-phase voltage $v_{\alpha\beta}$, using the $R_\gamma^{-1}$ transform block fed with angle $\gamma$. Then, this signal vector is transformed by the $T_{\alpha\beta}^{-1}$ block to form the commanded $v_{abc}^*$ three-phase voltages.

For illustration purposes, the presentation assumes two loop delay states. However, the method is general to any arbitrary number of delay states. Also, the harmonic factor $\beta=-2$ is shown for illustration, but any other integer value or values for $\beta$ could be chosen. If it is desirable to simultaneously suppress multiple harmonics, then multiple values of $\beta$ can be used in a block parallel implementation of the controller to achieve suppression for each harmonic. The blocks are shown for the control gains. These are indicating that the cross coupled gains are multiplied by the motor speed $\omega_m$. The transform blocks are showing the matrix operator transforms that operate on the signal vectors, and the z-dependent blocks are showing digital delays ($1/z$) and digital integration blocks ($Ts/(z-1)$).

The following formulas provide the algorithm explicitly, and these formulas are general enough to implement any of the controller forms discussed above. In the simpler cases, the respective gains that are not needed are simply set to zero.

$i_{\alpha\beta}[n]=T_{\alpha\beta}\cdot i_{abc}[n]$ $i_d[n]=\cos(\gamma)\cdot i_\alpha[n]+\sin(\gamma)\cdot i_\beta[n]$ $i_q[n]=\cos(\gamma)\cdot i_\beta[n]-\sin(\gamma)\cdot i_\alpha[n]$ $e_d[n]=i^*_d[n]-i_d[n]$ $e_q[n]=i^*_q[n]-i_q[n]$ $x_d[n+1]=x_d[n]+T_s\cdot e_d[n]$ $x_q[n+1]=x_q[n]+T_s\cdot e_q[n]$ $e_{d2}[n]=\cos(-2\gamma)\cdot e_d[n]+\sin(-2\gamma)\cdot e_q[n]$ $e_{q2}[n]=\cos(-2\gamma)\cdot e_q[n]-\sin(-2\gamma)\cdot e_d[n]$ $z_{d2}[n+1]=z_{d2}[n]+T_s\cdot e_{d2}[n]$ $z_d[n]=\cos(-2\gamma)\cdot z_{d2}[n]-\sin(-2\gamma)\cdot z_{q2}[n]$ $z_q[n]=\cos(-2\gamma)\cdot z_{q2}[n]+\sin(-2\gamma)\cdot z_{d2}[n]$ $v_{dpi}[n]=G_p\cdot e_d[n]-\omega_m[n]\cdot G_{pc}\cdot e_q[n]+G_i\cdot x_d[n]-\omega_m[n]$
$\cdot G_{ic}\cdot x_q[n]+G_h\cdot z_d[n]-\omega_m[n]\cdot G_{hc}\cdot z_q[n]-G_{DF1}\cdot v_{qpi}$
$[n-1]-\omega_m[n]\cdot G_{DFc1}\cdot v_{dpi}[n-1]-G_{DF2}\cdot v_{qpi}[n-2]+$
$\omega_m[n]\cdot G_{DFc2}\cdot v_{qpi}[n-2]$ $v_{qpi}[n]=G_p\cdot e_q[n]+\omega_m[n]\cdot G_{pc}\cdot e_d[n]+G_i\cdot x_q[n]+\omega_m[n]$
$\cdot G_{ic}\cdot x_d[n]+G_h\cdot z_q[n]+\omega_m[n]\cdot G_{hc}\cdot z_d[n]-G_{DF1}\cdot v_{qpi}$
$[n-1]-\omega_m[n]\cdot G_{DFc1}\cdot v_{dpi}[n-1]-G_{DF2}\cdot v_{qpi}[n-2]-$
$\omega_m[n]\cdot G_{DFc2}\cdot v_{qpi}[n-2]$ $$v_{dff}[n] = R_S \cdot i^*_d - \omega_e[n]\cdot\left(L_S - \frac{L_m^2}{L_r}\right)\cdot i^*_q[n]$$

$v_{qff}[n]=R_S\cdot i_q^*[n]+\omega_e[n]L_S\cdot i_d^*[n]$ $v_d[n]=v_{dpi}[n]+v_{dff}[n]$ $v_q[n]=v_{qpi}[n]+v_{qff}[n]$ $v\alpha[n]=\cos(\gamma)\cdot v_d[n]-\sin(\gamma)\cdot v_q[n]$ $v_\beta[n]=\cos(\gamma)\cdot v_q[n]+\sin(\gamma)\cdot v_d[n]$ $i_{abc}[n]=T_{\alpha\beta}^{-1}\cdot v_{\alpha\beta}[n]$ Often, negative sequence harmonics are small when the motor speed is small. Hence, optionally, the NS portion of the controller can be turned off below a particular motor speed threshold. This is accomplished by forcing the z-integrators to zero and resetting the x-integrators, whenever speed is below the speed threshold. Off conditions for the z-integrators are always zero and the values of z-integrators must be transferred to the $x_d$ and $x_q$ integrators according to the following formulas. Optionally, a hysteresis-based threshold (dual value) could be used for on the speed threshold, but the simple (single-valued) threshold is inherently noise resistant in this case, hence it may not provide any noticeable difference in performance.

$$x_d[n+1] = x_d[n] + \frac{1}{G_i}\cdot(G_h\cdot z_d - \omega_m\cdot G_{hc}\cdot z_q)$$

$$x_q[n+1] = x_q[n] + \frac{1}{G_i}\cdot(G_h\cdot z_q + \omega_m\cdot G_{hc}\cdot z_d)$$

The NS/PI controller outlined above was implemented on a digital control system and applied to a one horsepower, three phase induction motor with a 22% inductance imbalance added to one phase leg to demonstrate its effectiveness, although its use in not restricted to a particular power or size level. Successful suppression of the undesirable harmonic was realized while still maintaining high bandwidth operation.

Symbol Definitions

The following definitions and conventions are used in this document.

| | | |
|---|---|---|
| $T_s$ | digital sample time | |
| $N_{pp}$ | number of pole pairs | |
| $L_m$ | mutual inductance | |
| $L_{lr}$ | rotor leakage inductance | |
| $L_{ls}$ | stator leakage inductance | |
| $R_r$ | rotor resistance | |
| $R_s$ | stator resistance | |
| $L_r$ | rotor inductance | $L_r = L_m + L_{lr}$ |
| $L_s$ | stator inductance | $L_s = L_m + L_{ls}$ |
| $G_p$ | proportional gain [V/A] | $G_p$ |
| $G_{pc}$ | proportional cross gain [V/A] | $G_{pc}$ |
| $G_i$ | first integral gain [V/As] | $G_i$ |
| $G_{ic}$ | first integral cross gain [V/As] | $G_{ic}$ |
| $G_h$ | second integral gain [V/As] | $G_h$ |
| $G_{hc}$ | second integral cross gain [V/As] | $G_{hc}$ |
| $G_{DF1}$ | delay gain for delay 1 | $G_{DF}$ |
| $G_{DF2}$ | delay gain for delay 2 | $G_{DF}$ |
| $G_{DFc1}$ | delay cross gain for delay 1 | $G_{DFc}$ |
| $G_{DFc2}$ | delay cross gain for delay 2 | $G_{DFc}$ |
| $i_d^*, i_q^*$ | commanded dq-frame currents | [A] |
| $i_d, i_q$ | measured rotating dq-frame currents | [A] |
| $i_a, i_b, i_c$ | measured abc-frame currents | [A] |
| $i_\alpha, i_\beta$ | measured stationary dq-frame currents | [A] |
| $e_d, e_q$ | dq-frame current errors (positive frame) | [A] |
| $e_{d2}, e_{q2}$ | dq-frame current errors (negative frame) | [A] |
| $v_d, v_q$ | commanded dq-frame voltages | [V] |
| $v_{dff}, v_{qff}$ | feed-forward portion of dq-frame voltages | [V] |
| $v_{dpi}, v_{pqi}$ | feedback portion of dq-frame voltages | [V] |
| $v_\alpha, v_\beta$ | commanded stationary dq-frame voltages | [V] |
| $v_a, v_b, v_c$ | commanded abc-frame voltages | [V] |
| $x_d, x_q$ | PI dq-frame integral states | [As] |
| $z_{d2}, z_{q2}$ | NS dq-frame integral states (negative frame) | [As] |
| $z_d, z_q$ | NS dq-frame integral states (positive frame) | [As] |
| $\omega_m$ | estimated mechanical rotor speed | [rad/s] |
| $\gamma$ | estimated electrical synchronous angle | [rad] |
| $\omega_e$ | estimated electrical synchronous frequency | [rad/s] |
| VPI | PI dq-frame PI filter output voltages | [V] |
| VHS | NS controller subsystem output voltage | [V] |
| $\beta$ | harmonic factor | [no units] |
| n | discrete time | [no units] |

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

The present invention describes a design of a digital controller for a motor driven aircraft arrestment system of the type used on aircraft carriers, and often referred to as Advanced Arresting Gear (AAG). In general, a cable called a cross deck pendant extends across the aircraft carrier deck and is engaged by the incoming aircraft's tailhook. The starboard and port side ends of the cable are pulled by an electric motor based system in such a way as to bring the aircraft to a stop without exceeding the dimensions of decks' prescribed runway area and without excessive forces on the cables, the system, or the aircraft. The controller described here has advanced features, which provide many advantages over existing designs for controlling AAG systems. The present invention provides a unique control and feedback design.

Advanced Arresting Gear System

Figure 5:
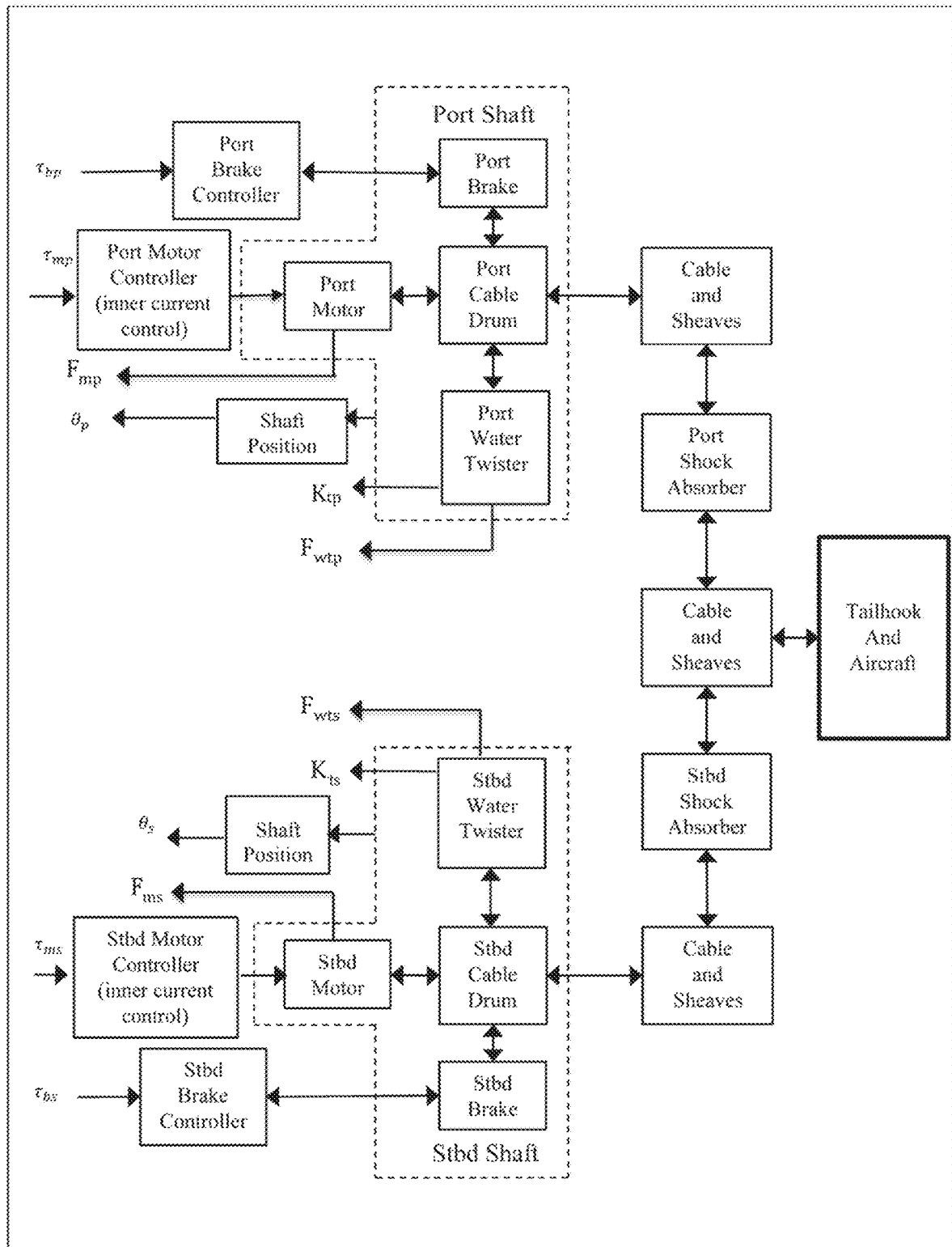
FIG. 5 depicts a block diagram of an advanced arresting gear (AAG) system, defining inputs outputs and various subsystems.

The AAG system is first described at a high-level view in order to provide a basic "plant" description for the system with relevant inputs and outputs identified, as needed for operation of a controller and feedback system. FIG. 5 depicts a block diagram of an advanced arresting gear (AAG) system, defining inputs outputs and various subsystems. Here, the "Tailhook and Aircraft" represent the aircraft that engages an arrestment cable on the deck of a carrier, with the tail-hook (attached to the aircraft) engaging the cable on landing. The AAG system has a port and a starboard (stbd) system that pull and control the arrestment cable to bring the aircraft to a halt by the time the aircraft reaches the end of the deck and without steering the aircraft outside of a designated side-to-side region. The cable is routed through sheaves, then to shock absorbers and then to cable drums attached to two independent (port and stbd) shafts which are controlled with water twisters, brakes and motors. The block diagram shows that each (port or stbd) shaft is composed of several pieces. The main cable drum stores (with many turns or wraps) the cable as it is pulled in. There is a friction brake that can apply torque resistance directly to the drum. There is also a water twister, connected with a shaft-coupler, which can provide a "speed-squared" torque resistance to the shaft system. And, there is a rotary motor, connected with a shaft-coupler, which can provide either torque resistance, or torque driving to the shaft system. For this embodiment, a rotary induction motor is used but other types of motors could be applied as well. Each brake requires its own local controller that converts incoming torque commands into the appropriate brake pressure to achieve the commanded torque. Also, each motor requires its own local controller that converts incoming torque commands into the appropriate motor currents using an inner loop current controller to achieve that torque. The inner loop current controller can be the well-known vector type current controller or other types of current controllers commonly used to control motor currents and generate torque. For highest performance applications, an electric motor current controller with negative sequence harmonic suppression is used here. This is the subject of Applicants' previous U.S. patent (Ser. No. 14/825,712 filed Aug. 13, 2015). Each shaft has encoders that measure the position changes along the shaft. Ultimately, one position measurement is generated for each side (port and stbd).

From FIG. 5, it can be seen that this system has four primary inputs and eight primary outputs. The inputs are four torque commands; $\tau_{bp}$ for the port side brake, $\tau_{mp}$ for the port side motor, $\tau_{bs}$ for the stbd side brake and $\tau_{ms}$ for the stbd side motor. The outputs are two position measurements; $\theta_p$ for the port side shaft position and $\theta_s$ for the stbd side shaft position. There are two outputs that indicate the torque factor for the stbd and port water twisters, $K_{ts}$ and $K_{tp}$. There are four fault flags; port and stbd motor failure $F_{mp}$ and $F_{ms}$, and port and stbd water twister failure $F_{wtp}$ and $F_{wts}$. The system is a multi-input, multi-output (MIMO), coupled system.

Outer Loop Controller Design

Figure 6:
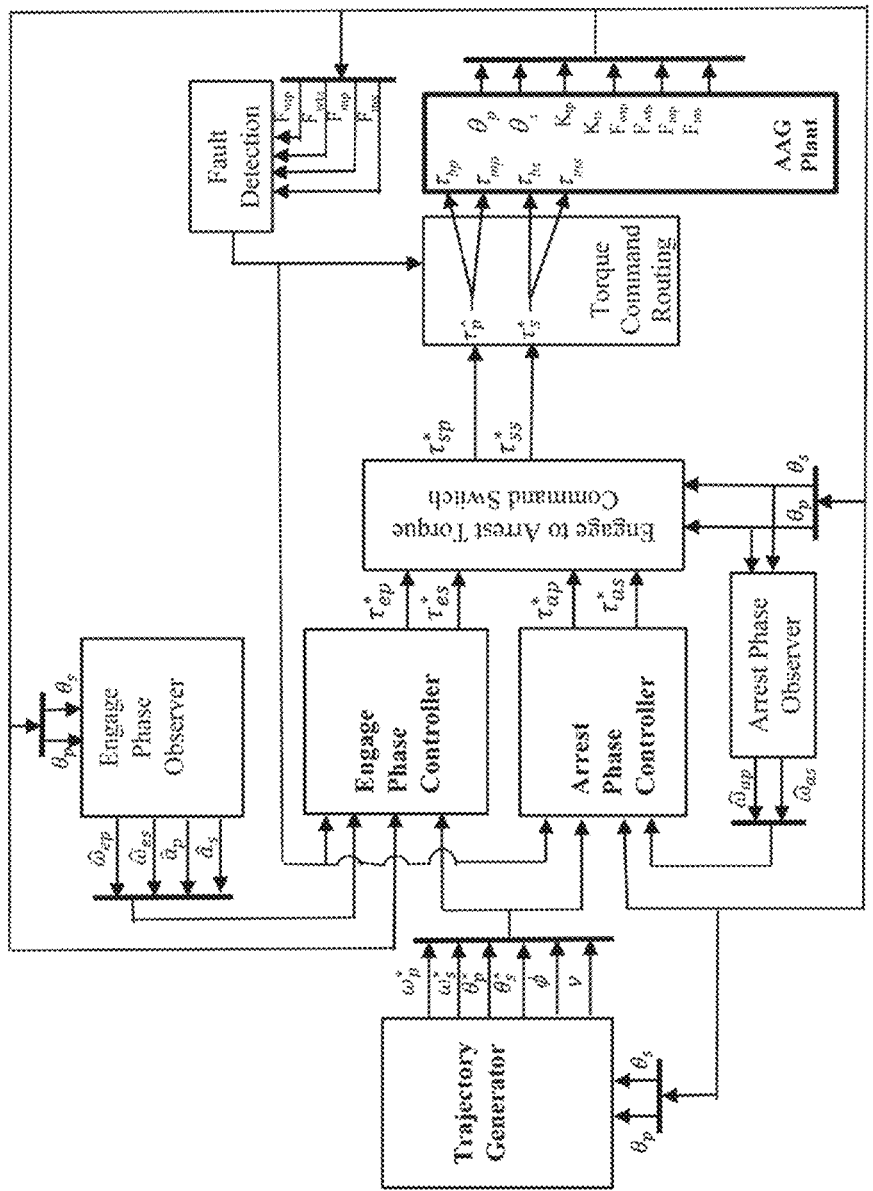
FIG. 6 depicts a block diagram of high-level control systems connected with the AAG plant system.

FIG. 6 depicts a block diagram of high-level control systems connected with the AAG plant system which includes the motor and inner current control loop. Here, the AAG plant is shown as a block (bolded block on the right side) with the primary four inputs and eight outputs, as described above. The outputs of the AAG plant provide the necessary position measurements, water twister constants, and fault flags that become the inputs to the controller system. The inputs of the AAG plant are the outputs of the controller system.

There is a "Torque Command Routing" subsystem that has the function of converting two general torque commands ($\tau_p^*$ and $\tau_s^*$), from a controller, into four specific torque command for the plant. The reason for this is that generally, under normal operation (i.e. no fault conditions), the brakes should not be used, unless absolutely necessary due to an unusual condition (aircraft anomaly or atypical environmental factors). The "Fault Detection" block is a subsystem that monitors all sensor and observer data and determines whether there is a system fault to determine whether brakes should be activated. For example, a motor or inverter failure would require the brake to take over for the motor, but only on the side affected. If there are no fault conditions detected, the "Torque Command Routing" block will command all torque to the motor, unless the command is greater than what the motor can do, in which case the extra torque is commanded to the brake. Note that the routing is done on a side by side basis (port or stbd) only. Hence, a port side input command $\tau_p^*$ is directed to $\tau_{bp}$ and $\tau_{mp}$ such that the sum equals $\tau_p^*$, and a stbd side input command $\tau_s^*$ is directed to $\tau_{bs}$ and $\tau_{ms}$ such that the sum equals $\tau_s^*$. The "Fault Detection" signals also affect the gain scheduling blocks within the Engage Phase Controller and the Arrest Phase Controller.

Figure 12:
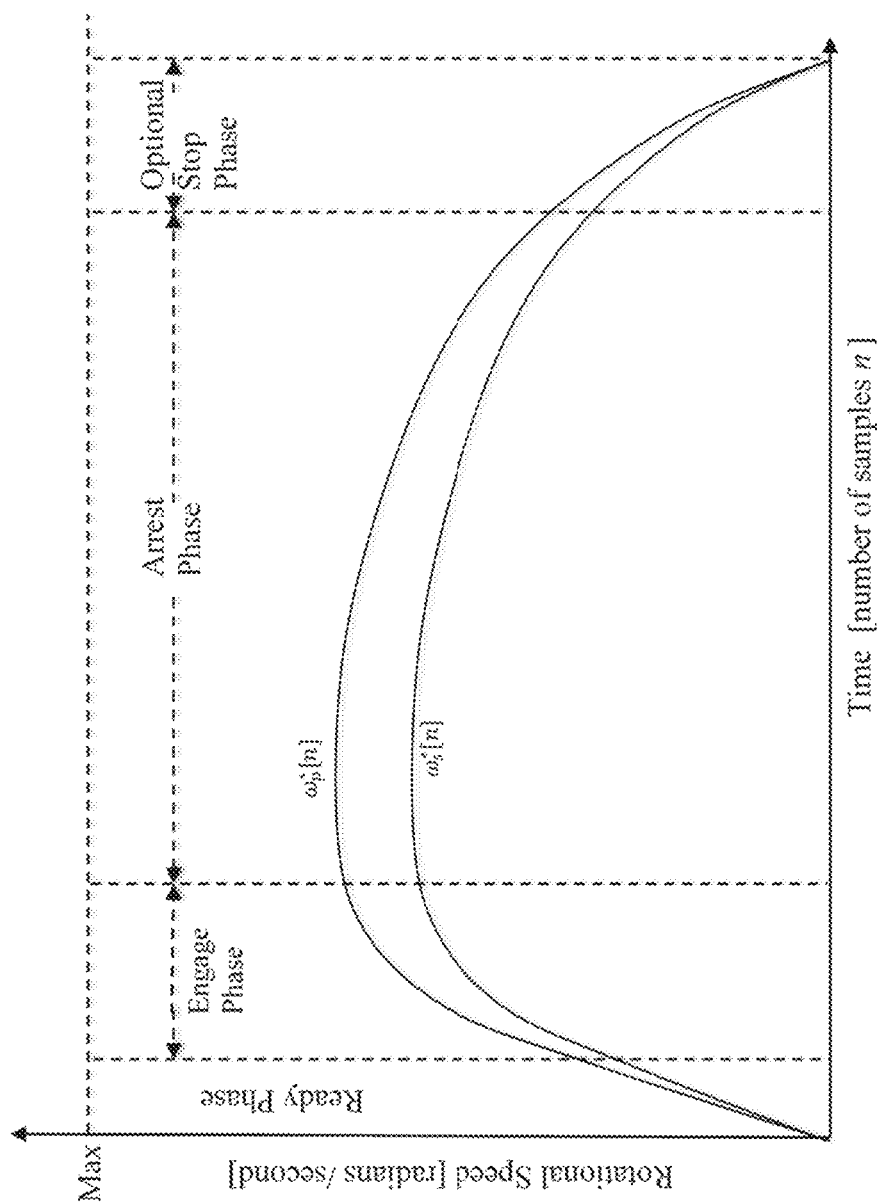
FIG. 12 depicts a plot of representative port ($\omega^*_p[n]$) and starboard ($\omega^*_p[n]$) shaft speed trajectories.

The "Engage-to-Arrest Command Switch" provides switching between two different controllers. There is an engagement-phase, which is the initial portion of the arrestment where the tail-hook catches the cable, and violent cable oscillations are occurring while the shock absorbers are helping to isolate the main shaft systems and the main shaft is gaining speed. Then there is an arrestment-phase which begins as the oscillations are dying down and the shock absorbers have extended most of their range. A typical arrestment profile is shown in FIG. 12. The switching between the two controllers, in these very different phases, can allow for better feedback control optimization in each phase. The "Engage-to-Arrest Command Switch" monitors the sum of the measured shaft angles and uses that as a basis for switching between engage and arrest phases. The use of the sum of the angles is more reliable than using time as a basis because the aircraft velocity varies greatly, and it is more reliable than using individual angles because the variation in offsets and skews cause the separate angles to vary greatly.

Figure 7:
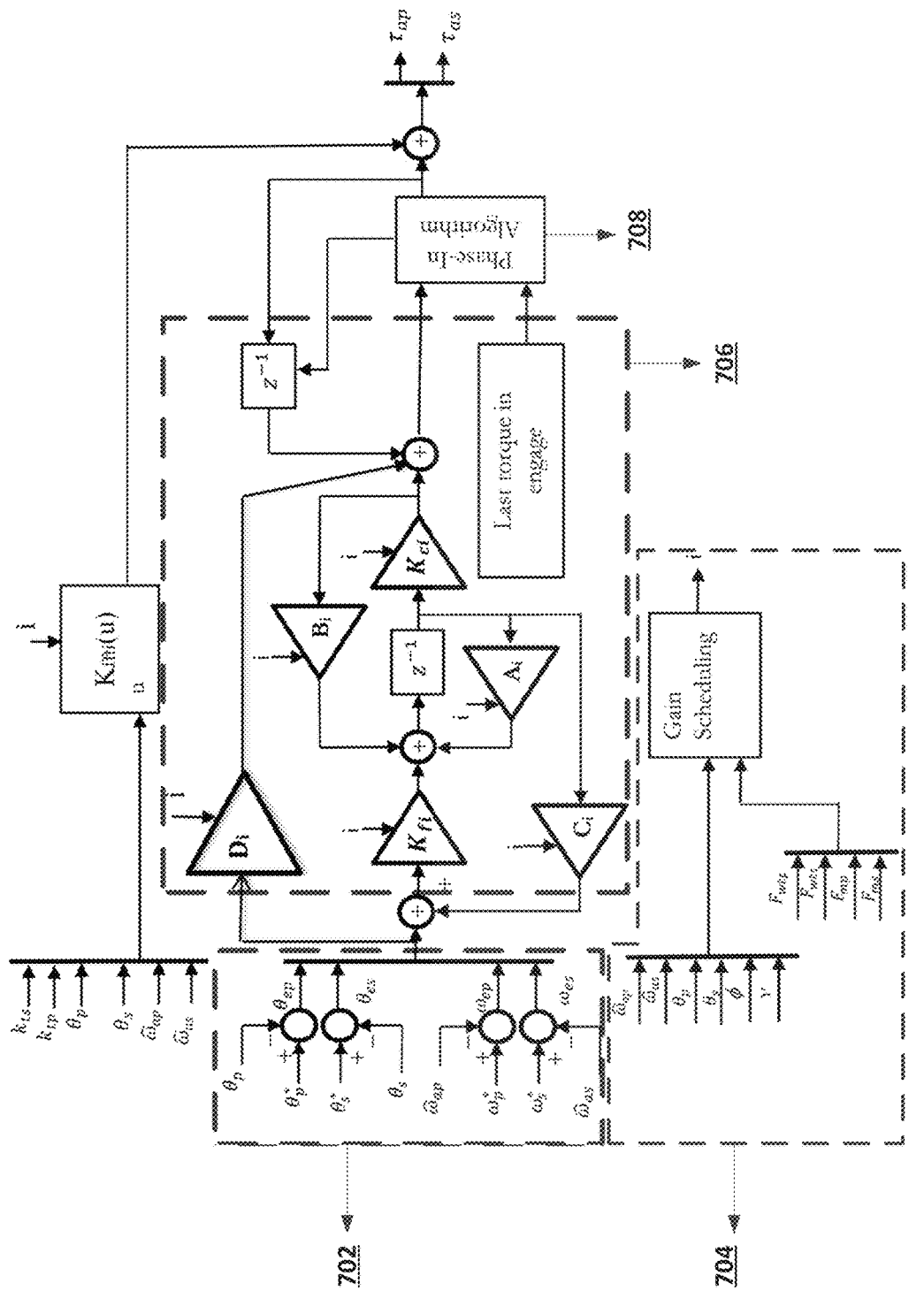
FIG. 7 depicts a block diagram of an embodiment of the arrest phase controller system.

The arrest phase of the arrestment uses the "Arrest Phase Controller" which provides the port and stbd torque commands, $\tau_{ap}$ and $\tau_{as}$, which then become $\tau_{sp}$ and $\tau_{ss}$ when the "Command Switch" determines that the arrest phase is actively controlling the AAG system. FIG. 7 depicts a block diagram of an embodiment of the arrest phase controller system. This topology is based on a known linear quadratic Gaussian/loop transfer recovery (LQG/LTR) control algorithm, which is a linear MIMO controller. Whereas control for the arrestment system is often designed by making the simplifying assumption that the stbd and port controls can be developed with classical single-input single-output design techniques, the controller development here utilizes MIMO LQG/LTR design techniques. This is very important for high performance since the system behavior is coupled and simplifying techniques that ignore this coupling do not have the flexibility to achieve optimal performance. Known optimal control techniques including linearizing plant dynamics around suitable operating points, model reduction, and LQG/LTR loop shaping are applied here. This architecture is additionally modified with a nonlinear output integrator with a saturation limiter embedding within the integrator, and a phase-in algorithm is used to transition the engage phase commanded torques into the outputs from this arrest phase controller.

The controller design gains $K_{ci}$ and $K_{fi}$ are determined using weighting matrices, which can shape the control loop transfer functions and dampen resonances in the system to achieve desired characteristics. A general AAG plant model is linearized at one or more operating points to give a state space design system with matrices $A_i$, $B_i$, $C_i$, and $D_i$. Note that the error signals $\omega_{ep}$ and $\omega_{es}$, for the controller, are based on the differences between commanded speeds and estimated speeds. The commanded speeds $\omega_p^*$ and $\omega_s^*$ are provided by the "Trajectory Generator" (described later in the document) and the estimated speeds $\hat{\omega}_{ap}$ and $\hat{\omega}_{as}$ are provided by the "Arrest Phase Observer" subsystem. The arrest phase observer is a derivative filter (using measured positions as input) with a bandwidth that is adjustable by changing its gains as required for optimal performance. Similarly, the error signals $\theta_{ep}$ and $\theta_{es}$, based on the differences between the commanded and measured positions, are calculated and can be used by the controller. However, it is noted that the controller may use only speed errors, only position errors, or combinations of both speed and position errors as required to achieve optimum performance.

The $K_{ffti}(u)$ block generates a feedforward torque command that is a function of position, velocity, and water twister factors. The feedforward can provide separate stbd and port torques along with constant and/or dynamic torque profiles. The Gain Scheduling block monitors system faults and also inputs velocity estimates, position estimates, effective skew angle $\phi$ and estimated aircraft velocity v. Based on combinations of these inputs, modes of operation can be deduced and a gain scheduling index, i, is generated. The gain scheduling index alerts the controller to change its gains and feedforward mappings for optimum performance. The system, therefore, is an adaptive controller that can automatically change its gains and feedforward profiles for best performance, when required.

The engage phase of the arrestment uses the "Engage Phase Controller" that includes an integrated "Inertial Compensation" block. The "Engage Phase Controller" subsystem provides the port and stbd torque commands, $\tau_{ep}$ and $\tau_{es}$ that includes $\tau^*_{inertia}$. The "Inertial Compensation" subsystem with output torque $\tau^*_{inertia}$ is a positive feedback controller that effectively makes the AAG shaft systems behave as if they have less rotational inertia. This helps relieve cable stresses when the cable initially tries to pull on the high inertia of the cable drum. Additional description is now provided with regards to the various subsystems in FIG. 7.

Reference Error Subsystem—702

The signals with superscript * that are generated by the Trajectory Generator are the desired position and velocity signals. The Trajectory Generator (see FIG. 11) takes as input the position of the rotating shafts, estimates the aircraft's present position based on the geometry of the arresting system and based on the allowed runway distance, it generates a position vs time profile, and a speed versus time profile for the aircraft (see Generate Aircraft Trajectory block in FIG. 11) that, if followed, will stop the aircraft in the proper distance and under dynamic conditions that do not violate specifications such as excessive speed, acceleration, or jerk. That profile for the aircraft is again reflected in an inverse manner (see Generate Shafts Trajectory in FIG. 11) to the corresponding profile for the rotary position and speed for both the port and starboard shafts. The profile of the aircraft is reflected to a profile for the shafts because the shafts are the actuators that the controller is using to affect the motion of the aircraft. The desired position for the shafts are given $\theta^*_p$, $\theta^*_s$, and the desired velocity profiles for the port and starboard shafts are $\omega^*_p$, $\omega^*_s$. The measured shaft positions are $\theta_p$, $\theta_s$ and the estimated shaft velocities are $\hat{\omega}_{ap}$ and $\hat{\omega}_{as}$ from the arrest phase observer. The error between the desired positions and the measured positions are $\theta_{ep}$, $\theta_{es}$, and the error between the desired velocities and estimated velocities are $\omega_{ep}$ and $\omega_{es}$. These are input to the controller and the controller applies output torque commands $\tau_{ap}$ and $\tau_{as}$ that will attempt to drive the errors to zero. In the case here, the velocities are being used without the positions, or equivalently the position gains could be set to zero. Generally, the controller can use both. If the errors are driven to zero, then the measured drum positions and estimated drum speeds are evolving as desired and the aircraft's motion is being nominally and indirectly controlled in a desirable way.

Gain Scheduling Subsystem—704

Figure 13:
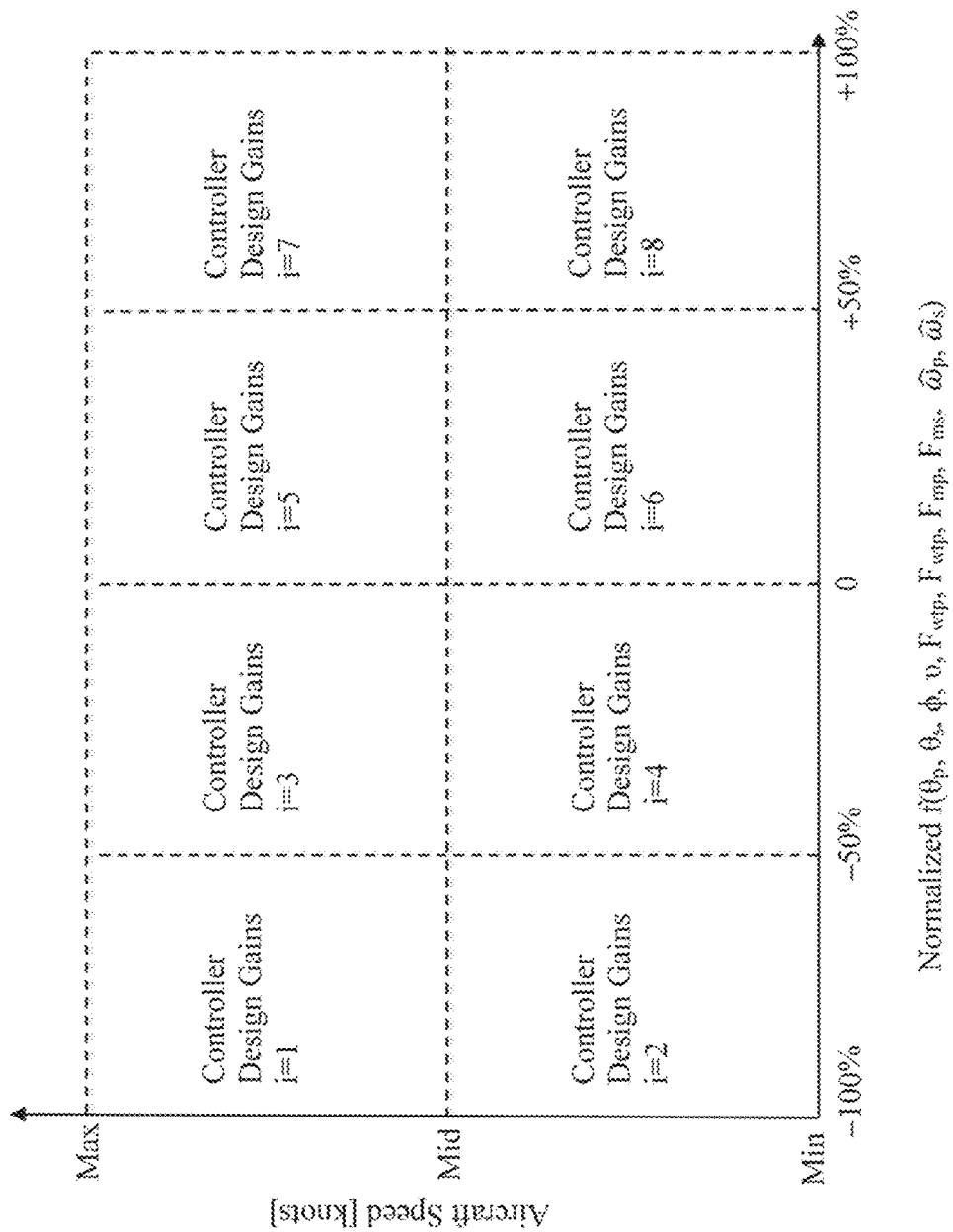
FIG. 13 illustrates a non-limiting example of a bin structure for controller gain scheduling.

Two sets of input signals are the inputs to the Gain Scheduling block. The first set are variables representing the dynamic state of the system. These are estimated velocity of the shaft, measure shaft positions, and the effective skew angle ϕ and estimated aircraft velocity v from the Trajectory Generator. The second set of inputs are fault inputs from the motor and water twister. The gain scheduling block divides the systems operating space into bins. For each bin, a new set of control gains are applied. The index, i, selects the control gains as shown in box 706. The subscript on $A_i, B_i, C_i, D_i, K_{fi}, K_{ci}$ are used to change those controller matrices and gains. The Gain Scheduling algorithm determines bins as shown in FIG. 13. In that example, the aircraft speed is divided into regions on the vertical axis and some function of the dynamic state and faults is used to divide the horizontal axis. Each bin has an optimized control design with a new set of matrices and gains that would be used by the controller when the system operating condition falls into that bin. In general, the bin structure can be multidimensional with multiple axes that further divide the operating space as required for optimal performance.

LQG/LTR Controller Gains and Dynamic States Subsystem—706

The LQG/LTR controller is a model based optimal controller for multi input multi output (MIMO) systems and it is known in advanced control literature. Here the LQG/LTR controller is augmented with integrators and gain scheduling. The matrices $A_i$, $B_i$, $C_i$, $D_i$ are a linear state space version of the nonlinear arresting gear system that has been linearized at a specific operating point and expressed in standard state space form. The linearized controller design model can contain the full number of states needed to represent the important dynamic behavior of the system, a larger number of states to provide loop shaping flexibility, or fewer states that capture only the most important states to reduce controller complexity. The matrix of gains $K_{fi}$ are determined during the LQG/LTR methodology when designing the target feedback loop to capture the attributes needed for desired performance. The matrix of gains $K_{ci}$ are determined when designing how aggressively the control actuation will be to recover the target feedback loop. In general, for a minimum phase plant, the LQG/LTR compensator will stably cancel the plant dynamics and replace them with the desired target design.

The Last Torque in Engage block feeds the last torque command issued from the engage phase controller and sends it to the Phase-In Algorithm. The engage phase controller is operating before the arrest phase controller.

Phase-In Algorithm—708

The Phase-In Algorithm is used to smoothly transfer the torque commands being applied to the motor from the Engage Phase Controller to the Arrest Phase Controller. As the system is transitioning from the Engage Phase to the Arrest Phase, the torque commands from the Engage Phase controller may not be the same as those of the Arrest Phase controller. In order to avoid generating a large torque transient, the initial torque command from the Arrest Phase controller is forced to match the final torque command from the Engage Phase Controller. The two commands can be scaled seamlessly from one to the other based on speed, position, or time for example. Another method used here is to utilize the embedded integrator state to start with the last torque command from the Engage Phase and then allow the integrator to evolve into the new torque command from the Arrest Phase controller.

Figure 8:
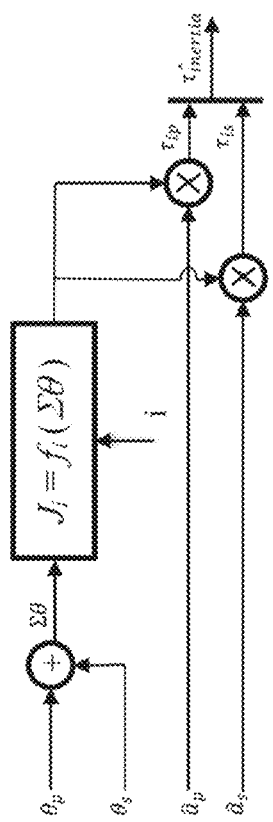
FIG. 8 depicts a block diagram of an embodiment of the inertial compensation system.

FIG. 8 depicts a block diagram of an embodiment of the inertial compensation system. The torque values are calculated by multiplying an inertia J by estimated accelerations, as shown in the bock diagram. However, the value of J is a function of the sum of the measured shaft angles. The estimated acceleration is provided by the "Engage Phase Observer" which provides a second derivative filter (using measured positions as input) with optimized bandwidth via selection of its gains.

Figure 9:
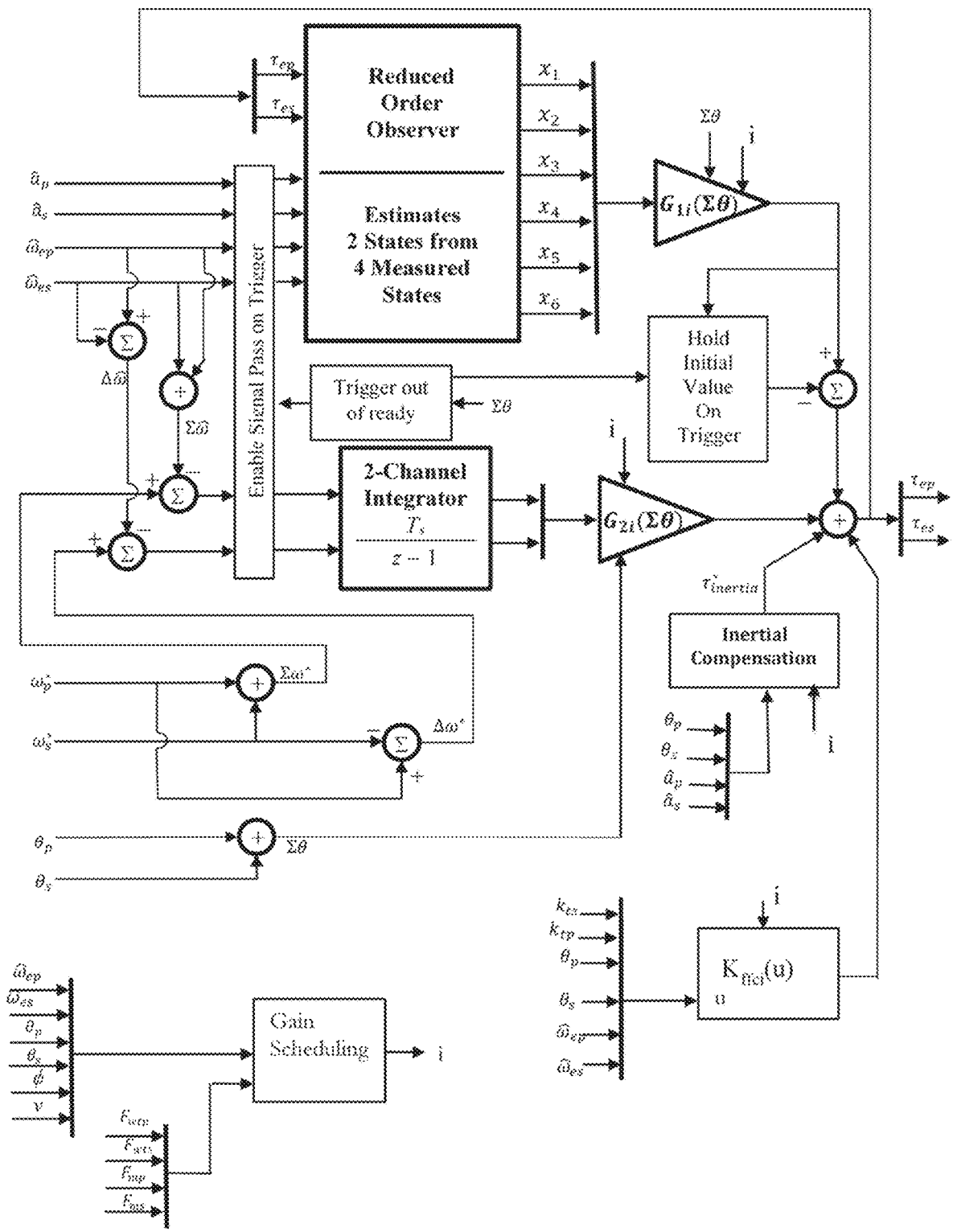
FIG. 9 depicts a block diagram of an embodiment of the engage phase controller system.

FIG. 9 depicts a block diagram of an embodiment of the engage phase controller system. The topology shown is based on a gain scheduled servo controller with integral and proportional gains, observer, inertial compensation, feedforward torque, and gain scheduling. Note that the arrest phase controller in FIG. 7 could be augmented with the inertial compensation subsystem and new gain sets, and then used as the engage phase controller instead of the one in FIG. 9. The choice of architecture depends upon the performance in the application. As shown here, the engage phase controller of FIG. 9 is used.

Referring to the engage phase controller in FIG. 9, there is an inner regulator gain matrix ($G_{1i}$, which is allowed to be a function of the sum of the measured shaft angles) and provides state feedback with the six states estimated by a reduced order observer. The outer tracking gain matrix ($G_{2i}$, which is allowed to be a function of the sum of the measured shaft angles) provides gains on the integrated errors. The engage phase controller is constructed to track the sums and differences of the shaft speeds. The commanded speeds $\omega_p^*$ and $\omega_s^*$ are provided by the "Trajectory Generator" (described later in the document) and the estimated speeds $\hat{\omega}_{cp}$ and $\hat{\omega}_{cs}$ are provided by the "Engage Phase Observer" subsystem. The engage phase observer provides a bandwidth limited derivative filter (using measured positions as input).

Figure 10:
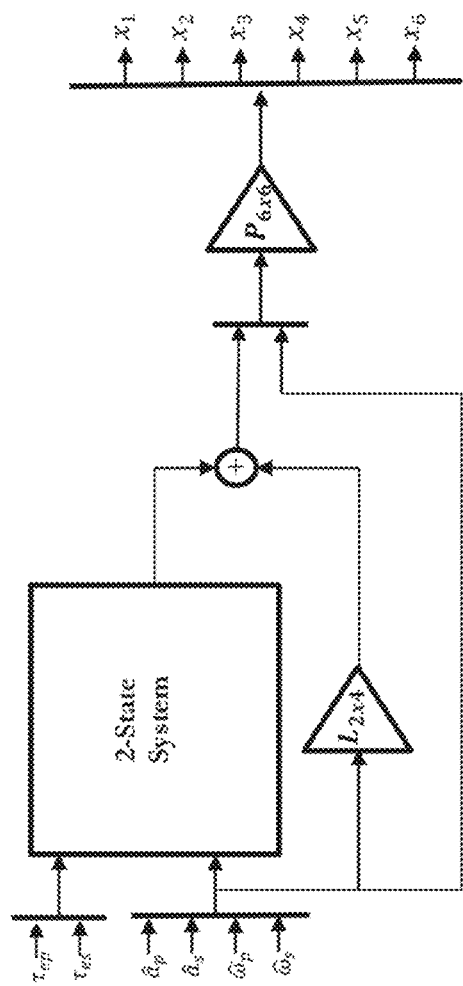
FIG. 10 depicts a block diagram of an embodiment of the reduced order observer system.

FIG. 10 depicts a block diagram of an embodiment of the reduced order observer subsystem used by the engage phase controller subsystem. Since four of the six states are measured by the engage phase observer, only two more states need to be estimated, and this means that either a full order observer or a reduced order observer structure as known in control literature can be used. The reduced order observer is appropriate here. The two additional states are estimated with feedback gains L (which is a 2×4 matrix) and P (which is a 6×6 matrix). The procedure for calculating these matrices is described in the existing control literature.

Figure 11:
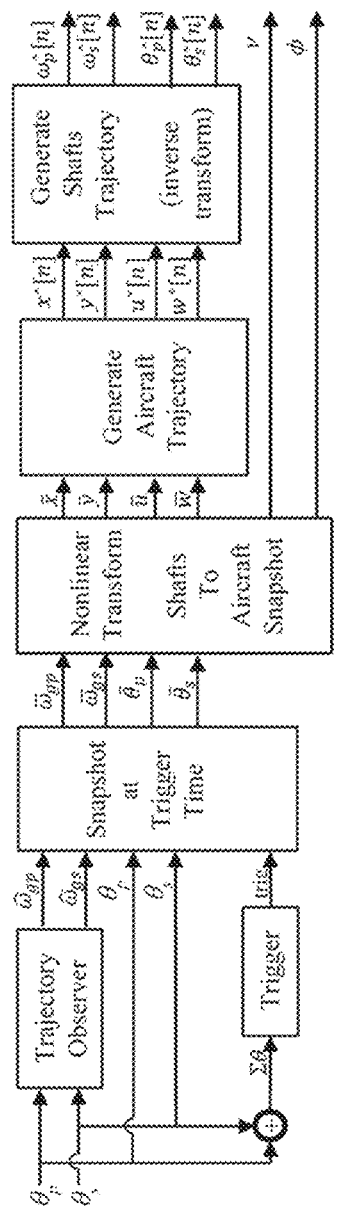
FIG. 11 depicts a block diagram of an embodiment of the trajectory generator system.

FIG. 11 depicts a block diagram of an embodiment of the trajectory generator subsystem which provides the port and stbd side speed and position references used by both the engage phase controller and the arrest phase controller. A trajectory observer is shown in the block diagram, and this design is similar to the arrest phase observer in that it is a band limited derivative filter providing port and stbd shaft speed estimates $\hat{\omega}_{gp}$ and) $\hat{\omega}_{gs}$ from shaft position measurements. The function of the trajectory generator is to provide a pair of speed and a pair of position references (for port and stbd) starting at the time of a trigger signal and ending at the completion of an arrestment. Measurements captured at the trigger time can be used to forward predict the shaft speed trajectory that will bring the aircraft to a halt at the required distance and with a prescribed (constant or variable) deceleration profile, along a straight line path, as determined by the aircraft estimated position and direction at the time of the trigger signal. The "Snapshot at Trigger Time" subsystem simply stores the values of port and stbd speeds and positions at the time the trigger signal is received, denoted by, $\overline{\omega}_{gp}$, $\overline{\omega}_{gs}$, $\overline{\theta}_p$, $\overline{\theta}_s$. These four values then go through the "Nonlinear Transform" block which calculates a snapshot of the aircraft x-position ($\overline{x}$), y-position ($\overline{y}$), x-speed ($\overline{u}$) and y-speed ($\overline{w}$). This block also outputs a snapshot of the effective skew angle ($\overline{\phi}$), and outputs a snapshot of the aircraft speed ($\overline{\upsilon}$). The "Generate Aircraft Trajectory" subsystem then uses the values to forward predict a desirable path for the aircraft that will stop it at the required end distance using a predetermined (often constant, or nearly constant) deceleration profile and expresses the positions and velocities in terms of the discrete time index n, as x*[n], y*[n], u*[n], and w*[n], respectively. The "Generate Shafts Trajectory" subsystem then performs the inverse calculations of the Nonlinear Transform" block, which then provides the shaft speed trajectory profiles that will achieve the goal of stopping the aircraft at the desired distance with the desired deceleration profile. The desired shaft port and starboard velocity and positions are expressed as $\omega^*_p[n]$, $\omega^*_s[n]$, $\theta^*_p[n]$, and $\theta^*_s[n]$, respectively.

FIG. 12 shows a plot of typical representative port and stbd shaft speed trajectory profiles. Rotational speed (typically measured in radian/second) is plotted against time (digital time measured in integer number of samples n where nT is the real time in seconds where T is the sample time in seconds). Note that the port and stbd trajectories are different and one is generally greater than the other, depending on aircraft offset and skew angle, when the hook is engaged. In this example, the offset and skew are such that the port side shaft needs to be spinning faster than the stbd side. Before an arrestment, the AAG system is in a "ready phase" awaiting detection of an aircraft hitting the cable. Upon detection of the aircraft (typically done by detecting movement of the shafts), the controller enters the "engage phase", as described previously. During the engage phase, the shock absorbers are paying out cable, and there are large disturbances caused by cable vibrations. This makes control during this phase difficult, and prior methods of control have not tried to use a trajectory for control. However, with this method of trajectory generation and engagement control, it is possible (and beneficial) to generate and track a trajectory during the engage phase. Once disturbances have died out and the shock absorbers have stroked near their maximum distance, the "arrest phase" is entered. At this point the trajectory generator can provide a more accurate trajectory for good control, and a more accurate effective skew estimation and aircraft speed are also provided. At the end of the arrestment, the controller can (optionally) enter a "stop" phase, which could be a position reference-based controller. The trajectory for position control is easily calculated from the speed trajectories by mathematically integrating the speed over time. A position based control is easily accommodated by the arrestment phase controller architecture by utilizing the $\theta_{es}$ and $\theta_{ep}$ signals with appropriate gains as shown in FIG. 7.

One of the challenges in designing an AAG control system is that it must work over a wide range of aircraft speeds, aircraft weights, offset distances and skew angles, even though none of these variables are measured directly with sensors. There are also various effects such as hookslip, cable dynamics, ship motion, windspeed etc. that alter the arrestment responses. These combined with the very tight specifications for maximum allowed cable tension, aircraft divergence and stopping distance makes it difficult to design a controller that meets all specifications. In practice, this creates a major problem and the solution used here is to configure the unique trajectory generator (discussed above) to estimate both aircraft speed and effective skew angle to aid in the gain scheduling algorithm. Gain scheduling allows the engage and arrest phase controllers to adapt to a variety of arrestment conditions and fault conditions by installing the best gains for optimal performance under the operating conditions. The gain scheduling block in the engage and arrest phase controllers provides an index that instructs the controller which gains set is most effective.

Based on the desired performance, functions of the variables $\theta_p$, $\theta_s$, $\phi$, $\upsilon$, $F_{wtp}$, $F_{wtp}$, $F_{mp}$, $F_{ms}$, and $\hat{\omega}_{wp}$, $\hat{\omega}$es for the engage controller or $\omega_{ap}$, $\omega_{as}$ for the arrest controller can be used to select the best gains for a particular condition. FIG. 13 a non-limiting example of a bin structure for controller gain scheduling. In the example, there are eight gain sets that are indexed by values of i. The odd values are gains used in the upper speed region and the even values are gains used in the lower speed region. The horizontal axis is a normalized function of the estimated variables and the fault conditions. The exact form of the function is application dependent. It should also be noted that the table can be generalized to a multidimensional table dependent on more than one function of the variables, and the speed as the vertical axis shows one of many such possibilities. This gain scheduling structure allows for controller adaptation with the necessary complexity to meet and optimize performance objectives. Of course, it is desirable to use the smallest possible table in order to keep complexity to a minimum. It should also be noted that it is desirable that boundaries between bins overlap to allow for uncertainty in the calculations of the normalized functions. In addition, it can be desirable to evaluate the function continuously to allow for improved estimates of the parameters as the arrestment progresses. Once regions of gains have been established, the controller can switch based on discreet regions or it can taper from one gain set to another or one controller to another based a function of the variables such as speed or position.

CONCLUSION

A system and method have been shown in the above embodiments for using bins to identify gain value(s) of an engage/arrest controller in an aircraft arrestment system. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method to identify a plurality of gain values of an arrest controller in an aircraft arrestment system, the method comprising:
   (a) maintaining a plurality of bins, each of the bins associated with at least one gain value in the plurality of gain values and covering an output range of an arrest controller function;
   (b) dynamically computing an arrest controller function value of the arrest controller function that is dependent on one or more of the following input parameters: a port side shaft position $\theta_p$, a starboard side shaft position $\theta_s$, an effective skew angle $\phi$, an aircraft speed $\upsilon$, one or more failure/fault flags, an estimated speed of portside shaft of the arrest controller $\hat{\omega}_{ap}$, and an estimated speed of starboard shaft of the arrest controller $\hat{\omega}_{as}$;
   (c) identifying a bin within the plurality of bins based on the dynamically computed arrest controller function value in (b);
   (d) determining, using weighting matrices, at least controller design gain values $K_{ci}$ and $K_{fi}$ within the one or more gain values of the arrest controller corresponding to the bin identified in (c), wherein controller design gain values $K_{ci}$ and $K_{fi}$ are picked to shape control loop transfer functions and dampen resonances in the aircraft arrestment system; and
   (e) shaping control loop transfer functions and dampening resonances in the aircraft arrestment system by applying the identified controller design gain values $K_{ci}$ and $K_{fi}$ in (d) in the arrest controller in the aircraft arrestment system.

2. The method of claim 1, wherein each of the bins covers a given output range of the arrest controller function versus a range of aircraft speeds.

3. The method of claim 2, wherein the range of aircraft speeds comprises at least an upper speed region range and a lower speed region range.

4. The method of claim 1, the one or more failure/fault flags comprises any of, or a combination of, the following: a port water twister failure/fault flag $F_{wtp}$, a starboard water twister failure/fault flag $F_{wts}$, a port motor failure/fault flag $F_{mp}$, a starboard motor failure/fault flag $F_{ms}$.

5. The method of claim 1, wherein gain scheduling is defined discretely for each bin as defined for a range of threshold values.

6. The method of claim 1, wherein gain scheduling is defined continuously using interpolation and/or functions of the aircraft speed, effective skew angle, and shaft positions.

7. The method of claim 1, wherein the arrest controller function is dependent the effective skew angle, wherein the effective skew angle is used to group similar sets of aircraft offsets and skew angles into different aircraft arresting condition bins.

8. The method of claim 7, wherein the arrest controller function is dependent on both the effective skew angle and the aircraft speed.

9. The method of claim 8, wherein fault conditions are used to further subdivide the bins to change controller gains or controller designs, now optimized for combinations of aircraft arresting condition, speed, and faults.

10. The method of claim 9, wherein available torque or use of different actuators/brakes are used to further subdivide the bins to change the controller gains or controller designs, now optimized for combination of aircraft arresting condition, speed, faults, and system limitations.

11. An article of manufacture comprising non-transitory computer storage medium storing computer readable program code which, when executed by a processor implements a method to identify a plurality of gain values of an arrest controller in an aircraft arrestment system, the medium comprising:
   (a) computer readable program code executed by the processor to maintain a plurality of bins, each of the bins associated with at least one gain value in the plurality of gain values and covering an output range of an arrest controller function;
   (b) computer readable program code executed by the processor to dynamically compute an arrest controller function value of the arrest controller function that is dependent on one or more of the following input parameters: a port side shaft position $\theta_p$, a starboard side shaft position $\theta_s$, an effective skew angle $\phi$, an aircraft speed $\upsilon$, one or more failure/fault flags, an estimated speed of portside shaft of the arrest controller $\hat{\omega}_{ap}$, and an estimated speed of starboard shaft of the arrest controller $\hat{\omega}_{as}$;
   (c) computer readable program code executed by the processor to identify a bin within the plurality of bins based on the dynamically computed arrest controller function value in (b);
   (d) computer readable program code executed by the processor to determine, using weighting matrices, at least controller design gain values $K_{ci}$ and $K_{fi}$ within the one or more gain values of the arrest controller corresponding to the bin identified in (c), wherein controller design gain values $K_{ci}$ and $K_{fi}$ are picked to shape control loop transfer functions and dampen resonances in the aircraft arrestment system; and
   (e) computer readable program code executed by the processor to shape control loop transfer functions and dampen resonances in the aircraft arrestment system by applying the identified controller design gain values $K_{ci}$ and $K_{fi}$ in (d) in the arrest controller in the aircraft arrestment system.

12. The article of manufacture of claim 11, wherein each of the bins covers a given output range of the arrest controller function versus a range of aircraft speeds.

13. The article of manufacture of claim 12, wherein the range of aircraft speeds comprises at least an upper speed region range and a lower speed region range.

14. The article of manufacture of claim 11, the one or more failure/fault flags comprises any of, or a combination of, the following: a port water twister failure/fault flag $F_{wtp}$, a starboard water twister failure/fault flag $F_{wts}$, a port motor failure/fault flag $F_{mp}$, a starboard motor failure/fault flag $F_{ms}$.

15. The article of manufacture of claim 11, wherein gain scheduling is defined discretely for each bin as defined for a range of threshold values.

16. The article of manufacture of claim 11, wherein gain scheduling is defined continuously using interpolation and/or functions of the aircraft speed, effective skew angle, and shaft positions.

17. The article of manufacture of claim 11, wherein the arrest controller function is dependent the effective skew angle, wherein the effective skew angle is used to group similar sets of aircraft offsets and skew angles into different aircraft arresting condition bins.

18. The article of manufacture of claim 17, wherein the arrest controller function is dependent on both the effective skew angle and the aircraft speed.

19. The article of manufacture of claim 18, wherein fault conditions are used to further subdivide the bins to change controller gains or controller designs, now optimized for combinations of aircraft arresting condition, speed, and faults.

20. The article of manufacture of claim 19, wherein available torque or use of different actuators/brakes are used to further subdivide the bins to change the controller gains or controller designs, now optimized for combination of aircraft arresting condition, speed, faults, and system limitations.

\* \* \* \* \*

UNITED STATES PATENT AND TRADEMARK OFFICE
CERTIFICATE OF CORRECTION

PATENT NO. : 11,537,118 B1
APPLICATION NO. : 17/371799
DATED : December 27, 2022
INVENTOR(S) : Raymond B. Sepe, Jr. et al.

It is certified that error appears in the above-identified patent and that said Letters Patent is hereby corrected as shown below:

In the Specification

Column 1, Line 59, after "speed", delete "b" and insert therefore -- $v$ --.

Column 2, Line 24, after "speed", delete "b" and insert therefore -- $v$ --.

Column 7, Line 2, before "transform" insert therefore -- $R_\gamma^{-1}$ --.

Column 7, Line 35, before "that" insert therefore -- $R_\gamma^{-1}$ --.

Column 7, Line 49, delete "V$_{qip}$" and insert therefore -- V$_{qpi}$ --.

Column 18, Line 36, delete "$\hat{\omega}_{es}$" and insert therefore -- $\hat{\omega}_{es}$ --.

Signed and Sealed this
Twentieth Day of June, 2023

Katherine Kelly Vidal
*Director of the United States Patent and Trademark Office*